United States Patent [19]
Ahl et al.

[11] Patent Number: 5,313,461
[45] Date of Patent: May 17, 1994

[54] METHOD AND DEVICE IN A DIGITAL COMMUNICATION NETWORK

[75] Inventors: Karl-Axel Ahl, Malmo; Joakim Nelson, Lund; Kaj G. Lindfors, Haninge, all of Sweden

[73] Assignee: Inventahl AB, Malmo, Sweden

[21] Appl. No.: 859,517

[22] Filed: Jun. 8, 1992

[30] Foreign Application Priority Data

Oct. 19, 1989 [SE] Sweden .................. 8903455-7

[51] Int. Cl.$^5$ .............................................. H04J 3/16
[52] U.S. Cl. ...................................... 370/94.2; 370/79; 370/95.1
[58] Field of Search ................ 370/56, 80, 84, 94.1, 370/94.2, 95.1, 95.3, 38, 79, 81

[56] References Cited

U.S. PATENT DOCUMENTS

| | | | |
|---|---|---|---|
| 4,107,609 | 8/1978 | Gruenberg | 375/40 |
| 4,144,496 | 3/1979 | Cunningham et al. | 455/55.3 |
| 4,169,214 | 9/1979 | Stump | 370/56 |
| 4,414,661 | 11/1983 | Karlstrom | 370/95.1 |
| 4,517,669 | 5/1985 | Freeburg et al. | 370/94.2 |
| 4,625,308 | 11/1986 | Kim et al. | 370/104 |
| 4,633,463 | 12/1986 | Mack | 370/95.1 |
| 4,686,672 | 8/1987 | Namiki | 370/95.3 |
| 4,688,218 | 8/1987 | Blineau et al. | 370/94.2 |
| 4,696,053 | 9/1987 | Mastriani et al. | 455/67.5 |
| 4,698,803 | 10/1987 | Haselton et al. | 370/60 |
| 4,755,992 | 7/1988 | Albal | 370/94.1 |
| 4,759,051 | 7/1988 | Han | 379/59 |
| 4,775,999 | 10/1988 | Williams | 379/59 |
| 4,785,450 | 11/1988 | Bolgiano et al. | 370/95.1 |
| 4,833,701 | 5/1989 | Comroe et al. | 379/60 |

FOREIGN PATENT DOCUMENTS 0201254 11/1986 European Pat. Off.
WO89/08355 9/1989 PCT Int'l Appl.
2165127A 4/1986 United Kingdom.

OTHER PUBLICATIONS

"Dynamic Channel Assignment in High-Capacity Mobile Communications Systems," D. C. Cox et al., The Bell System Technical Journal, vol. 50, No. 6, Jul.-Aug. 1971, pp. 1833-1856.

Primary Examiner—Benedict V. Safourek
Attorney, Agent, or Firm—Merchant & Gould Smith, Edell, Welter & Schmidt

[57] ABSTRACT

A system and method for connecting two or more peripheral stations to a central station over a common service resource. Each station is connected to one or more switching units; the common service resource is adaptively shared as a function of traffic going to and from the switching units. In one embodiment, capacity in the common service resource is divided into a series of frames, each frame having a set number of time slices, with information form one or more of the switching units being transferred within a time slice. In one such embodiment, time slices which will not be used during a particular frame due to the lack of or repetitive nature of information from a particular switching unit can be used to transfer information from a different switching unit.

4 Claims, 15 Drawing Sheets

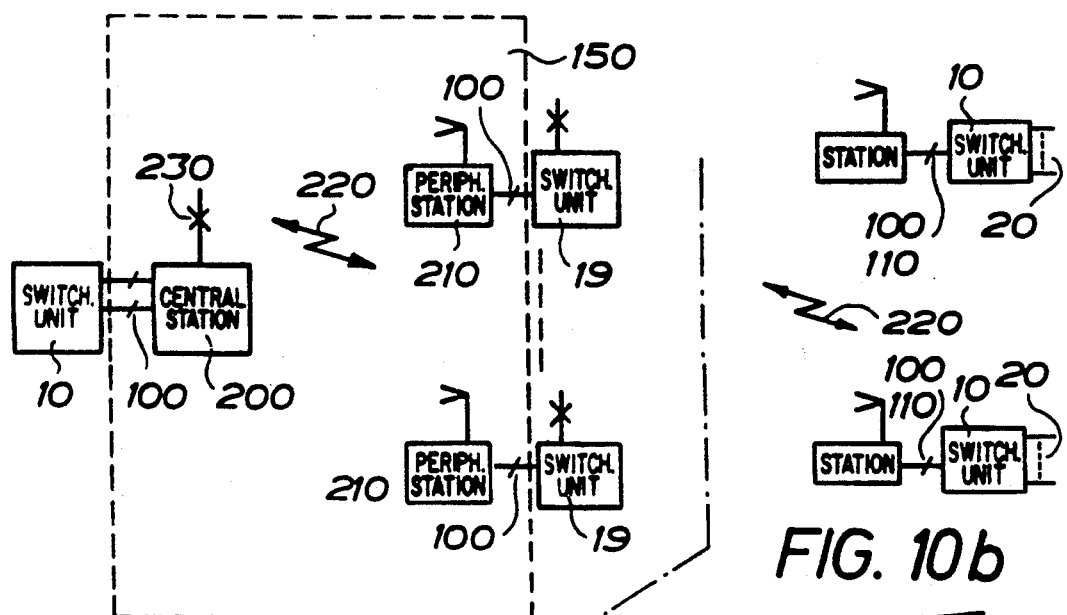
FIG. 10a
FIG. 10b
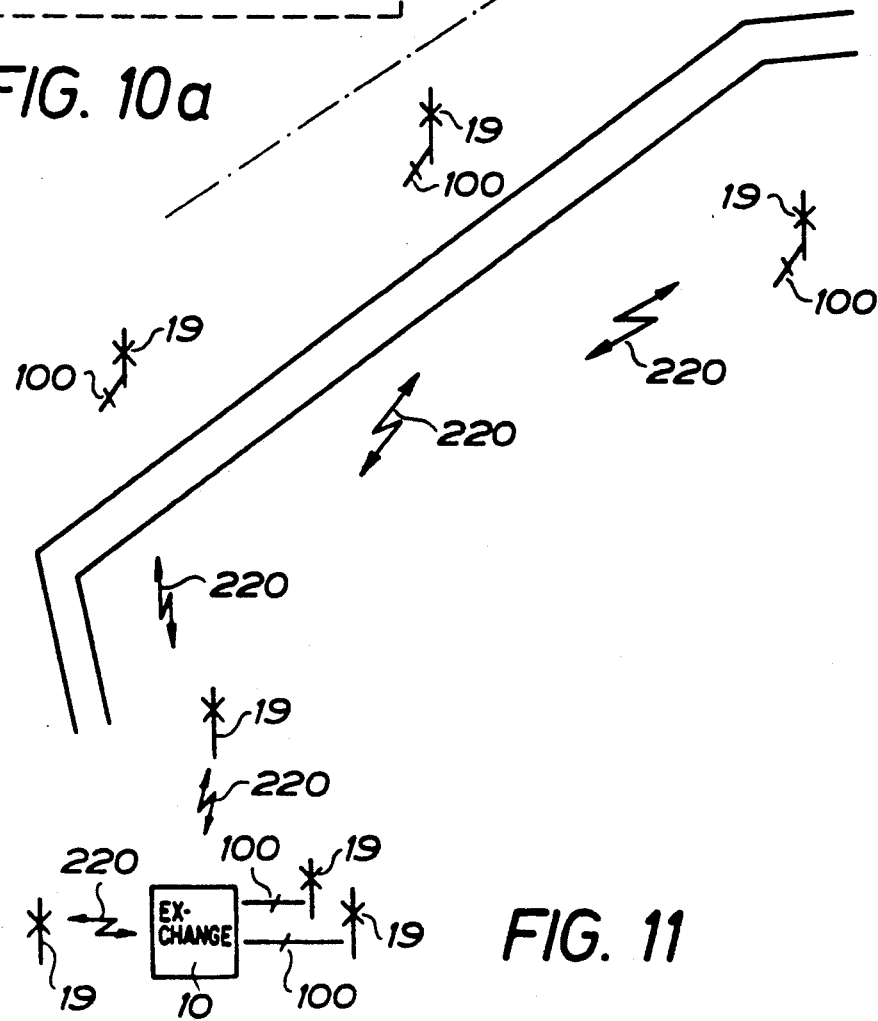
FIG. 11

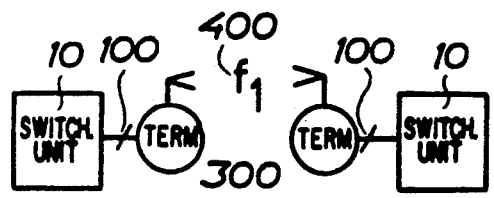
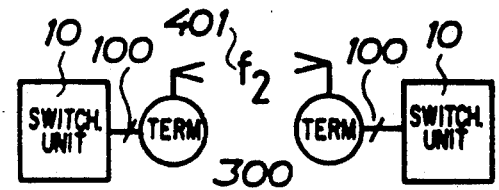
FIG. 12a
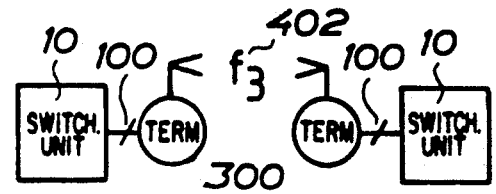
FIG. 12b
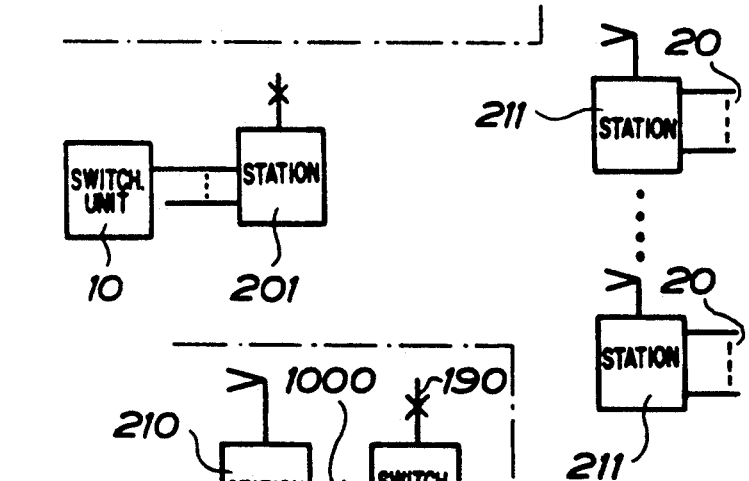
FIG. 13
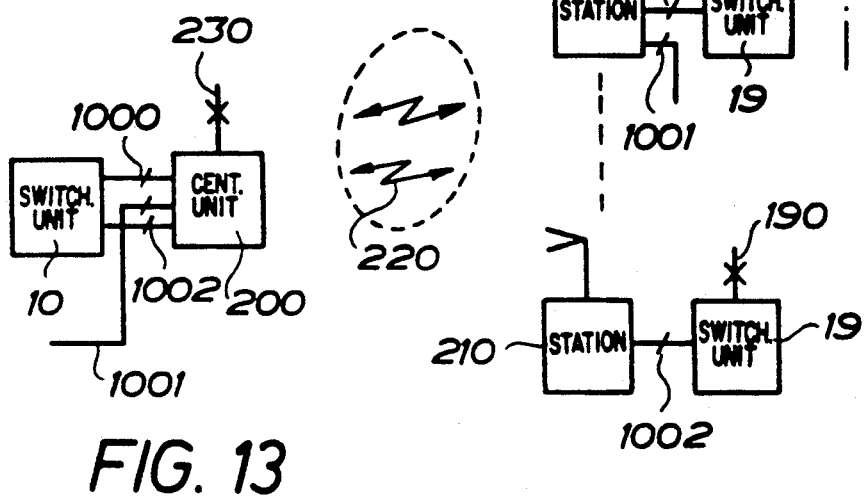

METHOD AND DEVICE IN A DIGITAL COMMUNICATION NETWORK

Terrestrial fixed setup synchronous digital telecommunications channels are used between pairs of different switching units. Such switching units include for instance existing circuit-coupled or packetlength-coupled telephone exchanges for speech/data, mobile base stations and their associated mobile sub stations, and local area network (LAN's). Existing solutions for connecting such units are typically based on point to point connections, preventing an efficient usage of service resources. An object of the invention is to provide a common utilization for more users than can be connected point to point, said users thereby using fewer connections and saving band width. A classical example of such an approach is, for instance, that each telephone subscriber cannot be directly and fixedly connected to those whom he sometimes needs to communicate with. Instead, each subscriber is connected to a switching network and the switching network provides the common utility used to connect two subscribers.

The method is based on the fact that a certain number of physical connections are made between two points in a system. Each connection has a capacity, giving a probable obstruction of traffic in a theoretical traffic situation. In data applications a common resource, such as existing cable or fibre, Ethernet, FDDI, MAN, is used for many. Communication between networks can be based on OSI layer 2, HDLC, SDLC etc or layer 3, i.e. system packages according to IEEE standards or the like. Normally a connection to said networks is based on layer 3, CSMA/CD in a Ethernet etc.

Fixed digital synchronous tele-connections are further used for connection of switching units such as for instance: multiplexors between each other, digital concentrators to telephone exchanges, mobile base stations or radio exchanges to superior exchanges, bridges for connecting LAN's, and routers for computer to computer communication. In an exchange to an ISDN terminal connection each unit uses a terminal connection unit.

A switching unit is characterized by systems used today or by future systems of a circuit-coupled, packet-length-coupled, or packetswitching type which provide a possibility to connect multiple subscribers to a single switching unit. Normally fixed synchronous multiplexed or non-multiplexed connections are utilized in connecting switching units to each other. In so-called remote connections for LAN's bridges with standard interfaces, such as G.703, V.35, V.36 etc, to the telephone systems are used. Also packet systems can be used, for instance in bridges for Ethernet to CSMA/CD protocol or the like, for the connection of LAN's to each other.

In many data communications systems, connections are established from point to point, normally through multiplexors with medium/methods such as: wire, cable, fibres, radio links, lightwave link or satellite.

Digital synchronous networks built in this way optimize the traffic flow between each pair of switching units being connected to each other.

A drawback of this method is that the traffic capacity in a transmission medium is utilized only for a communication between the two points being connected to each other. That means that each point to point connection must be optimized separately depending to the peak traffic.

U.S. Pat. No. 4,625,308 discloses a dynamic TDMA traffic allocated satellite communications system, the individual capacity of each satellite terminal being controlled by controlling and varying each burst length in correspondence to traffic requirements in each terrestrial station.

U.S. Pat. No. 4,606,672 disclose a supple method for identifying varying burst lengths in a TDMA satellite system.

U.S. Pat. No. 4,698,803 discloses a general burst-switching communications systems for voice and data services having an efficient utilization of bandwidth etc.

GB,A,2 165 127 discloses different access methods in a radio system during different traffic situations.

The present invention provides a terrestrial method and a communications system comprising mutual connection and co-utilization of three or more connection points arranged in an area, space or region.

An object of the invention is to provide a method to be implemented in a system of a wide area terrestrial radio type system which makes it possible to generally utilize services between a plurality of types of standard switching units in a more flexible and cost saving, more efficiently bandwidth saving, less sensitive to interference and not protocol depending method than previously known systems.

Instead of an existing method with a point to point connection between switching units in digital synchronous connections a new method is applied which is intended to solve a certain connection requirement within an area or a space of a certain geographical region. The method is implemented by connecting three or more connection terminals of independent or dependant connection points to a common communication resource. Dynamically, according to subscribers' traffic requirements, only such information in each connected signal necessary for each individual service to be communicated through the communications system is communicated selectively, if desired. The communications system for each connected synchronous digital signal transfers information for each service according to the needs of the subscribers. For example, by time division multiplexing of connected digital signals and by selecting the information that must be transferred. The transfer of information through the communications system takes place according to the system time dividing structure. That structure is separated from time structures, if any, of said connected signals. Connected signals are time divided, and an adaption is made of the information of said connected signals to the time dividing of said communications system before transferring any of the connected signal information over the communications system to be transferred.

FIG. 10a) shows an example of a common communication system implementation in a terrestrial wide area communications network between for instance a mobile base station and an exchange connected to them.

FIG. 10b) illustrates other applications than mobile systems.

FIG. 11 shows how wide area communications system in practice can be implemented for mobile base stations. The dynamics of traffic, which are calculated to vary heavily in different parts during different time intervals, adaptively utilizes the total resources of the communications systems in the parts most appropriate at that time.

FIG. 12a) illustrates an application of a point to point radio link connecting different switching units. If the stations are close to each other so that they in respect of radiowave may interfere different frequences must normally be used.

FIG. 12b) illustrates that a wide area system can be implemented with a common frequency.

FIG. 13 shows how different connected digital signals to be transferred are transferred between stations in the wide area system in accordance with varying capacity requirements or possible applications.

Figure 14:
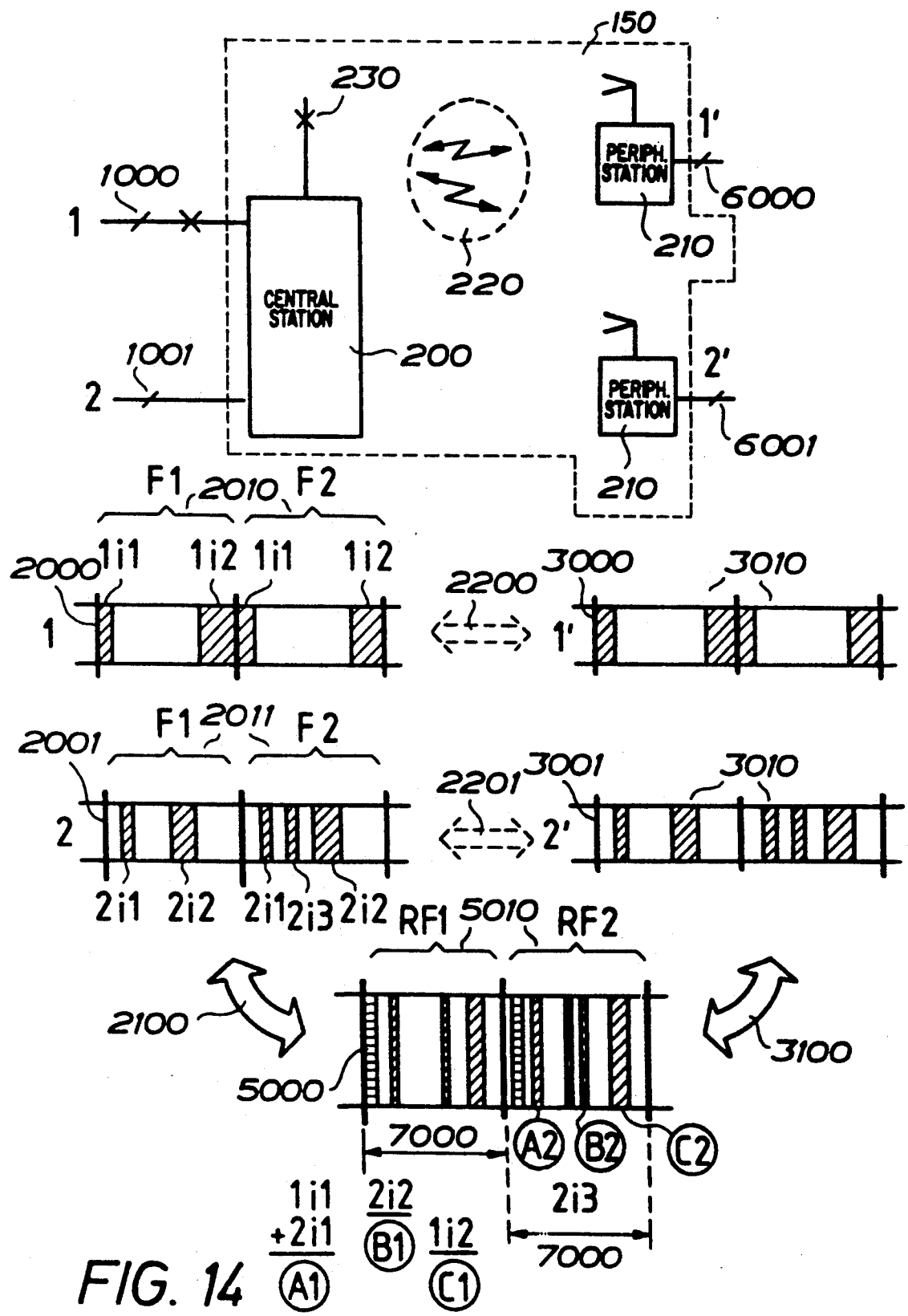

FIG. 14 illustrates fundamentals of the time dividing method or sampling of connected digital signals and the transfer according to the time dividing structure of the communications systems and also how each transferred sample from each connected signal is recreated on the opposite station end.

Figure 15:
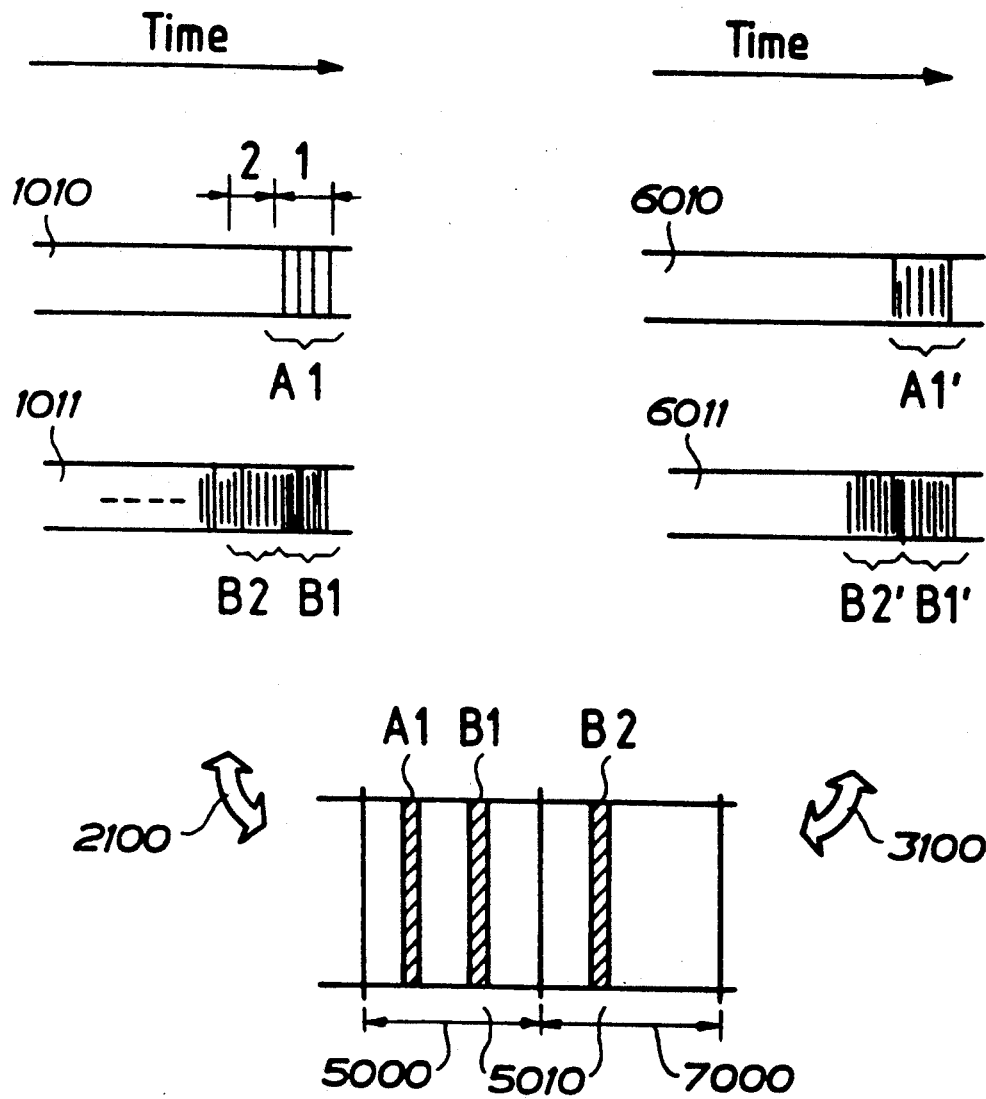

FIG. 15 shows how different types of connected signals, or information of said signals, which are intended to be transferred through the system firstly are detected with respect to content before being exposed to a time frame structure of the communication system and secondly are reconnected in original shape, including simulation of redundant information in opposite station end if required.

Figure 16:
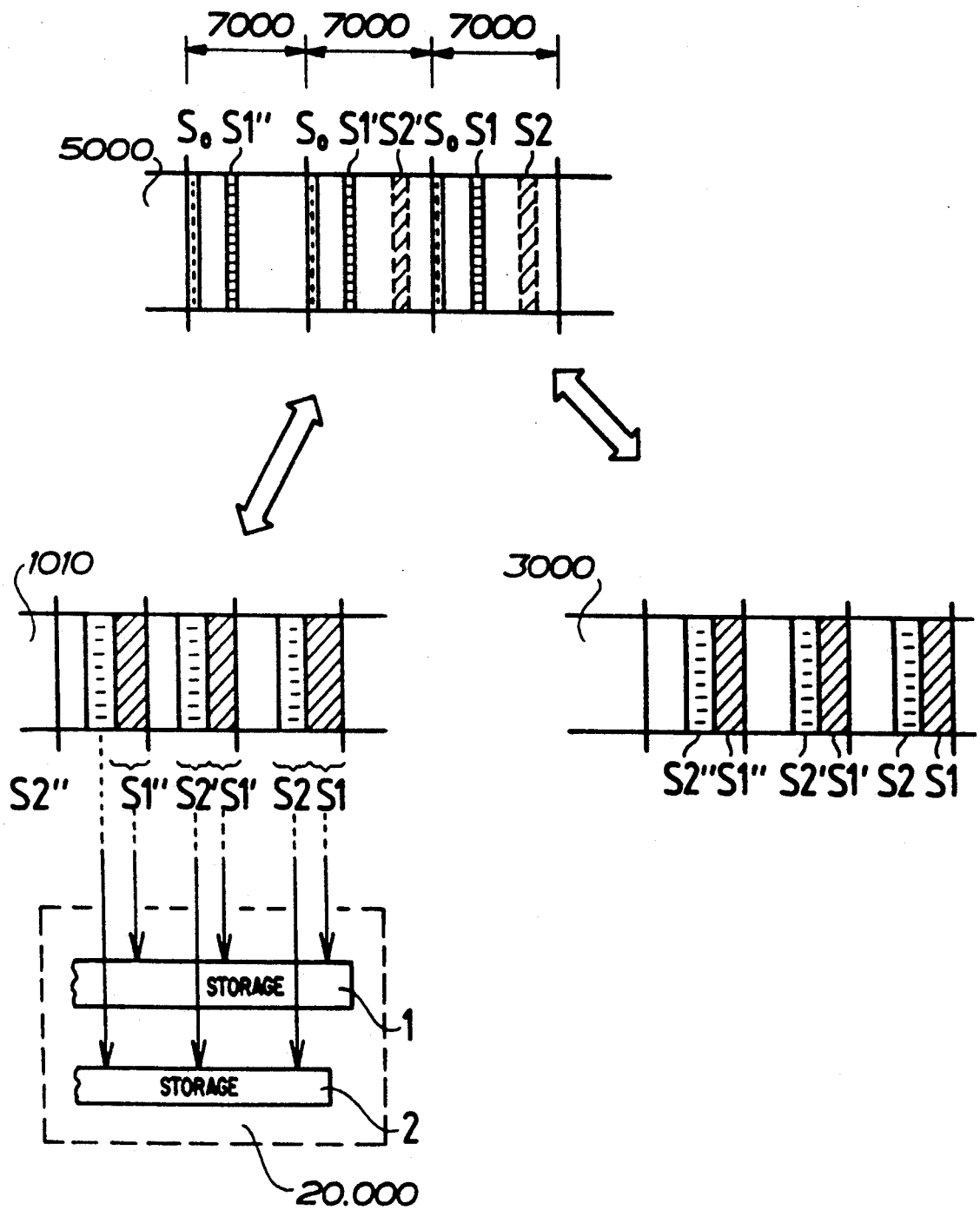

FIG. 16 illustrates how excessive samples of a segment information in a connected signal are compared to previous samples so as to avoid transferring non-redundant information.

Figure 17A:
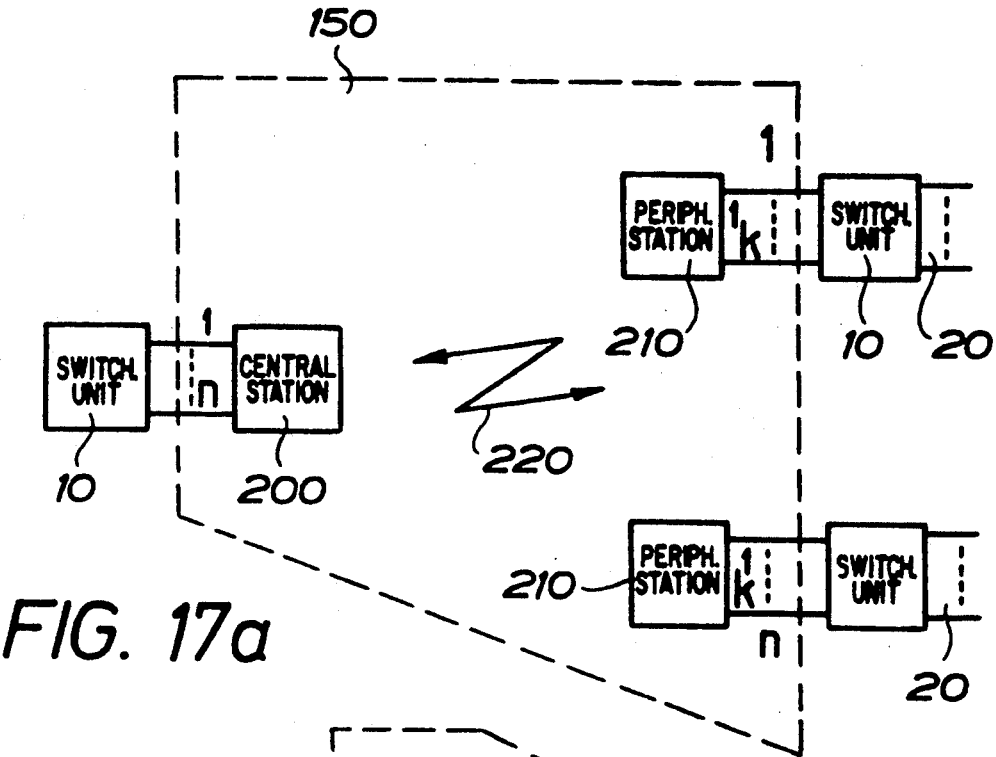

FIG. 17a) shows schematically a wide area communications system comprising one or several central stations and one or a plurality of peripheral station connected to said central station(s). Each central station has connections of a plurality of digital signals, 1 ... n, and each of the peripheral stations has a plurality of connected digital signals, 1 ... k.

Figure 17B:
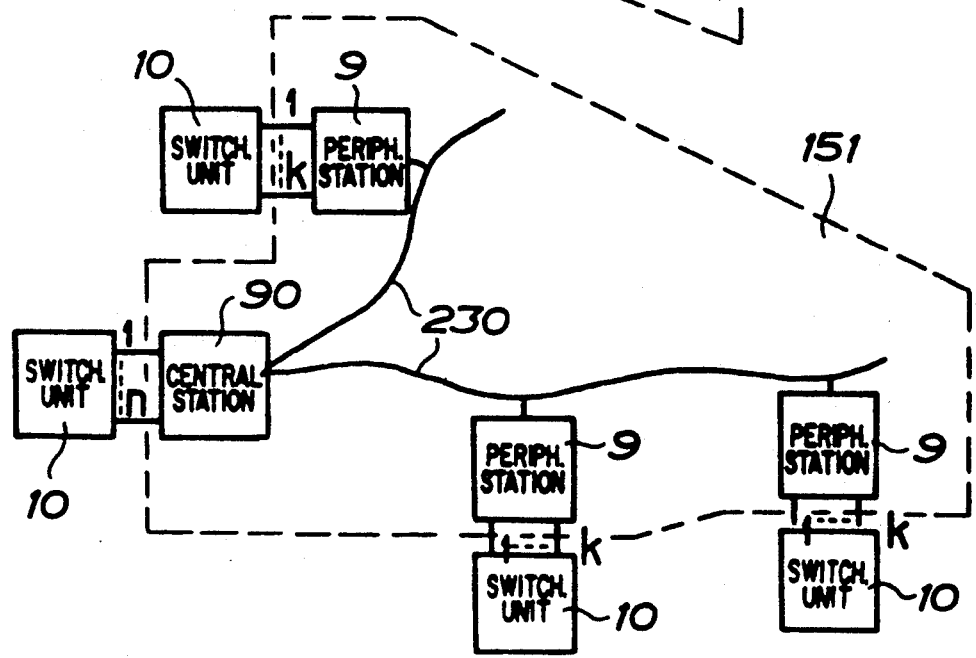

FIG. 17b) illustrates that the method can be implemented in cable, fibre or a corresponding medium.

Figure 18:
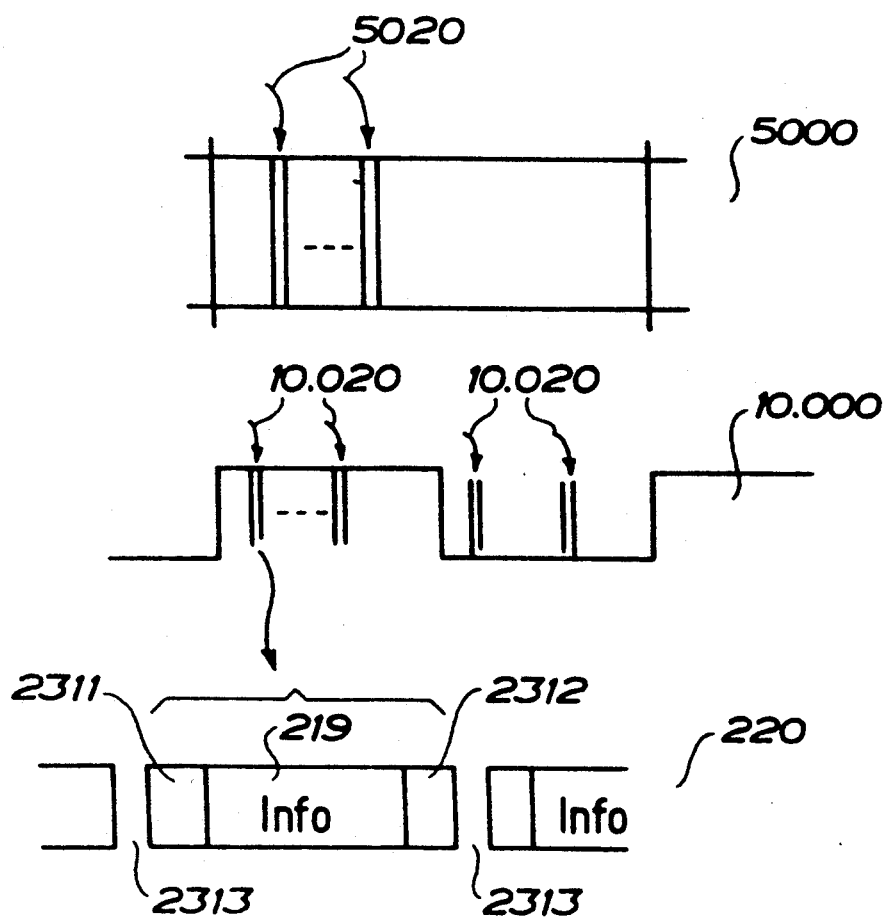

FIG. 18 illustrates the alternative frame structures of a time and space controlled system, if duplex or time duplex is used. Time slices in the frame structure of the communications system are represented by a number of digital bits and by a protective distance between time frames of the communications systems to prevent an overlap.

Figure 19:
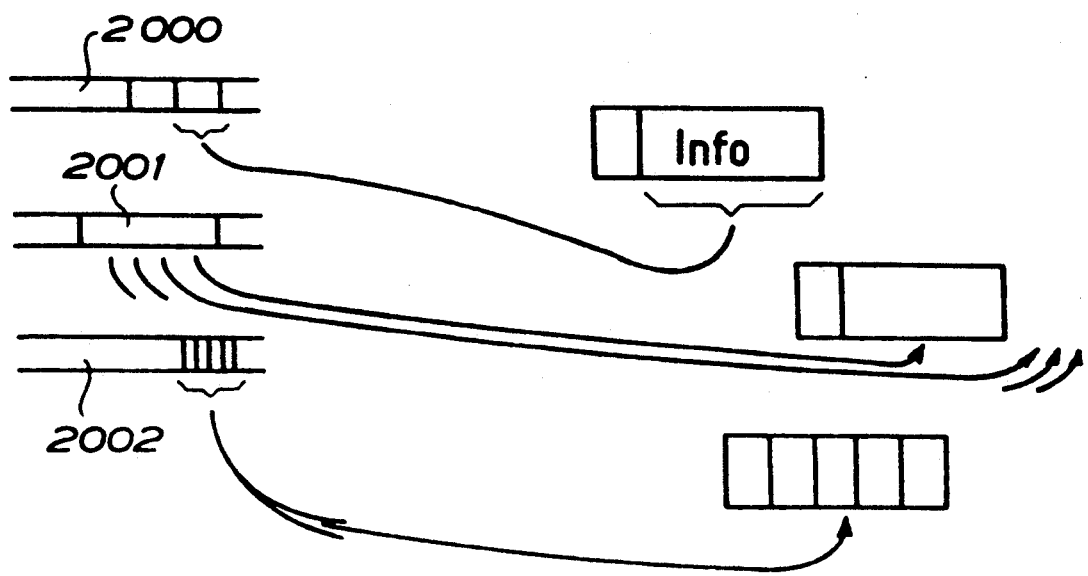

FIG. 19 shows schematically how different types of signals, multiplexed according to the PCM or HDLC etc or any other non-multiplexed connected type of signal are sampled and put into packages in the frame structure of the communications system.

Figure 20:
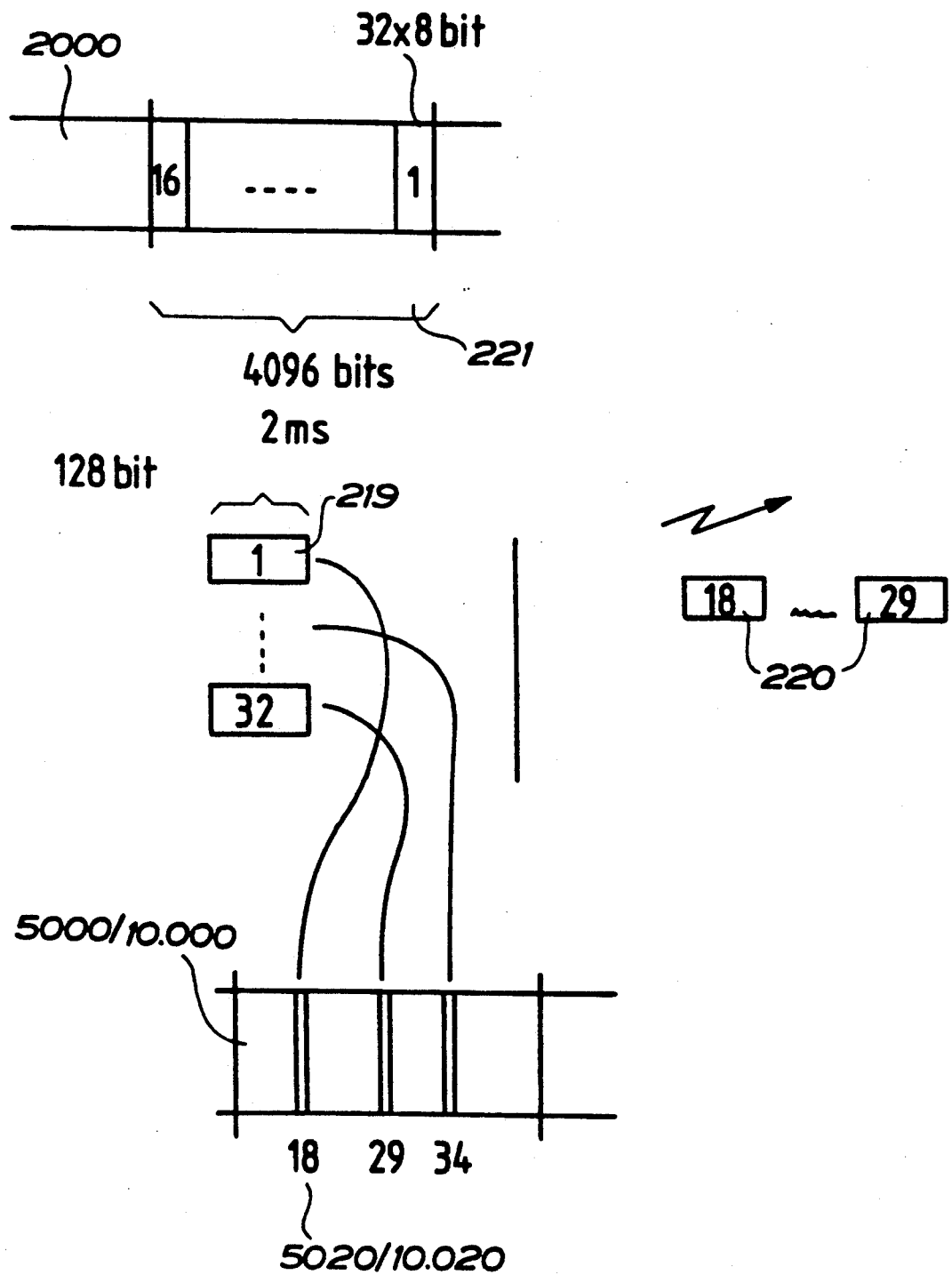

FIG. 20 illustrates an example of how consecutive samples of a digital signals of 2.048 Mbit/s being multiplexed according to G.732 in intervals of 2 ms can be analyzed with regard to information content in each time slice in a connected signal to be placed in an appropriate time slice in the frame structure of the communications system for those time slices of a connected signal that have to be transferred.

Figure 21:
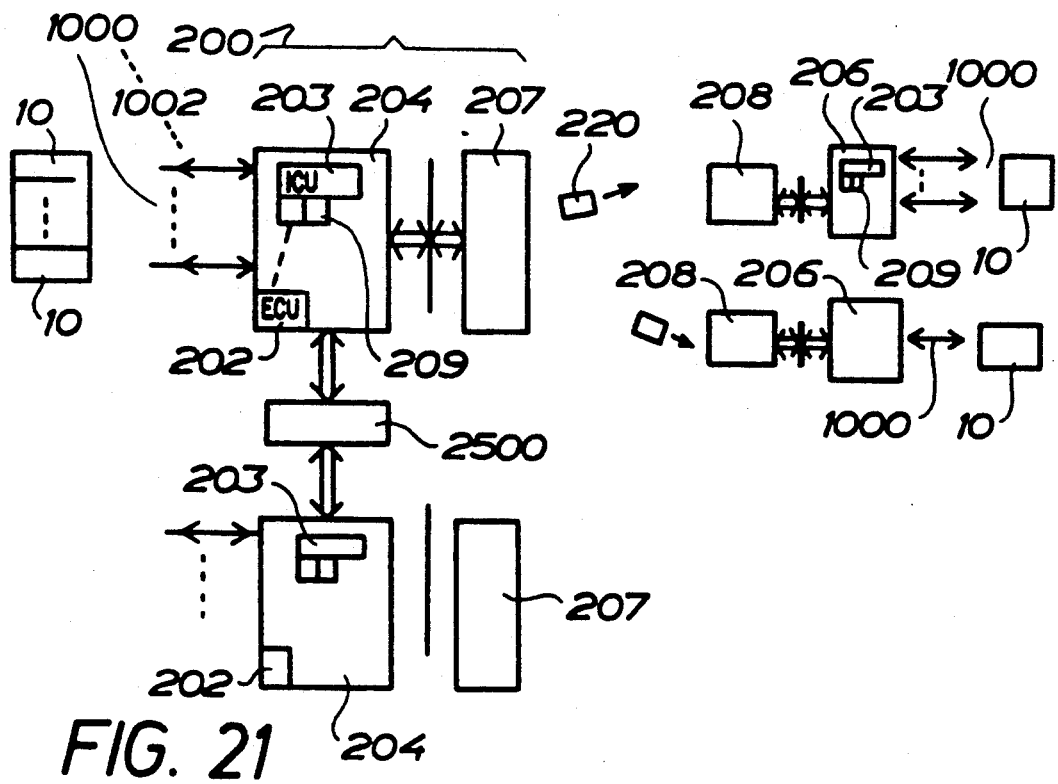

FIG. 21 illustrates in more detail the fundamentals of the wide area system.

Figure 22:
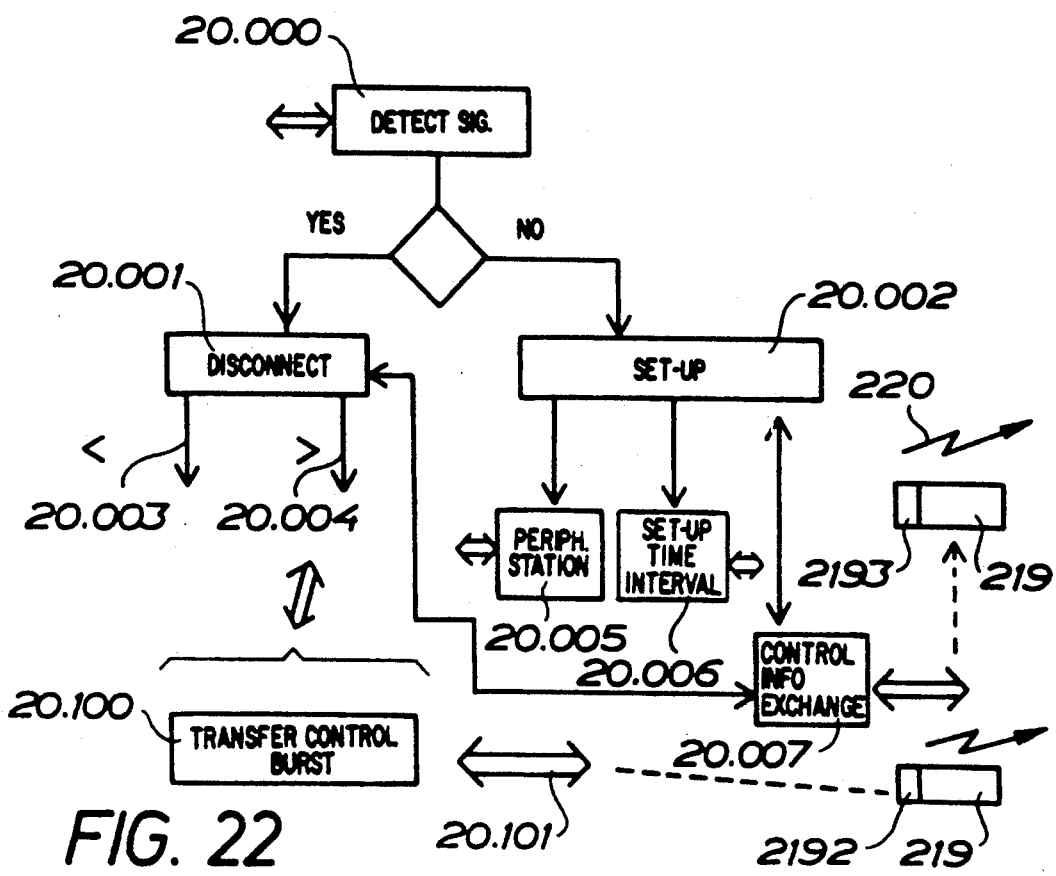

FIG. 22 shows schematically how information in a sample results in allocating a new time channel in the communications system and also how detected valuable information after some programmed time interval uses capacity in the communications system.

Figure 23:
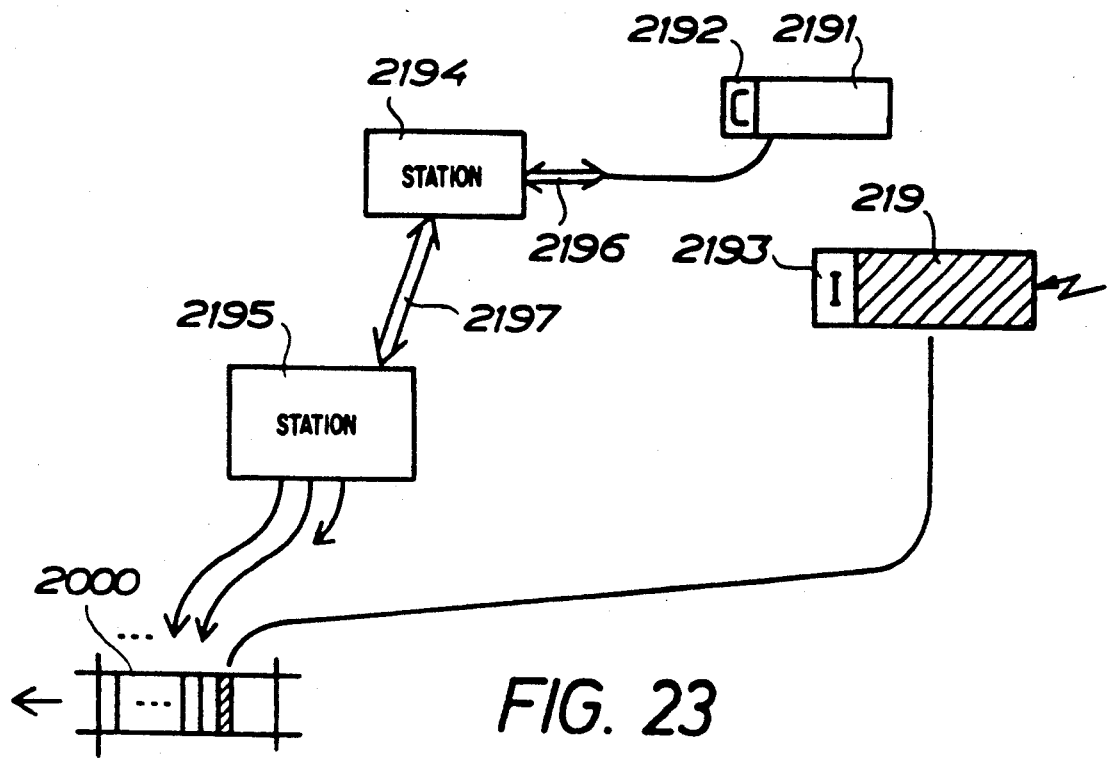

FIG. 23 illustrates how packages carrying customer information in the communications system are erected to a connected recreated output signal. It is also shown that control information between two stations communicating or being prepared for communication is directed through control packages.

Figure 24:
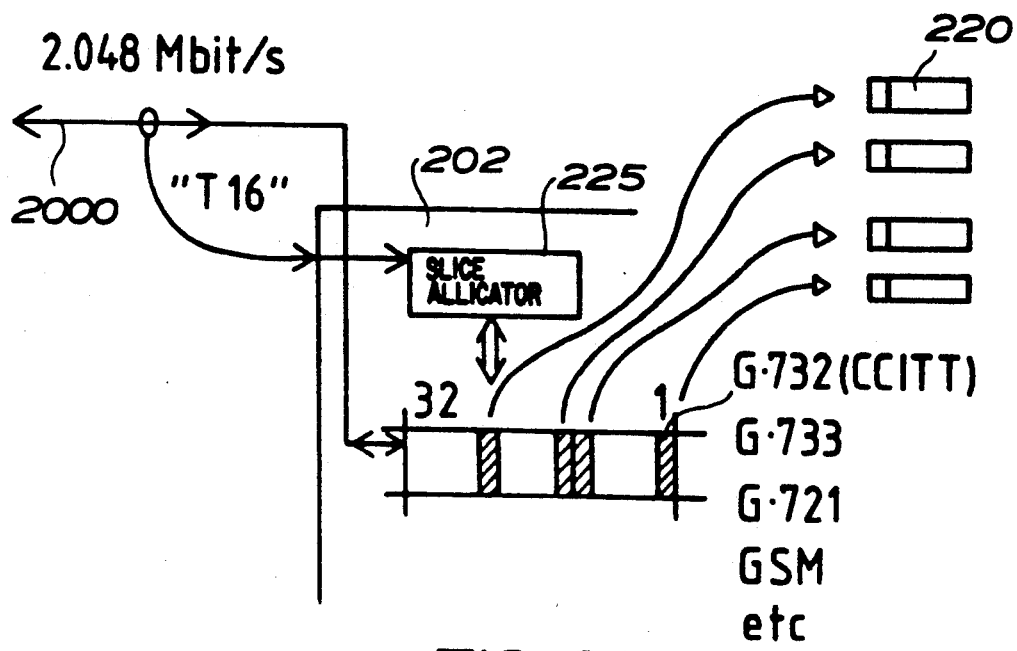

FIG. 24 shows an example of the way external signal information applied to a connected signal or other external control conditions to be transferred are detected and control the establishing of connections in the communications system.

Figure 25:
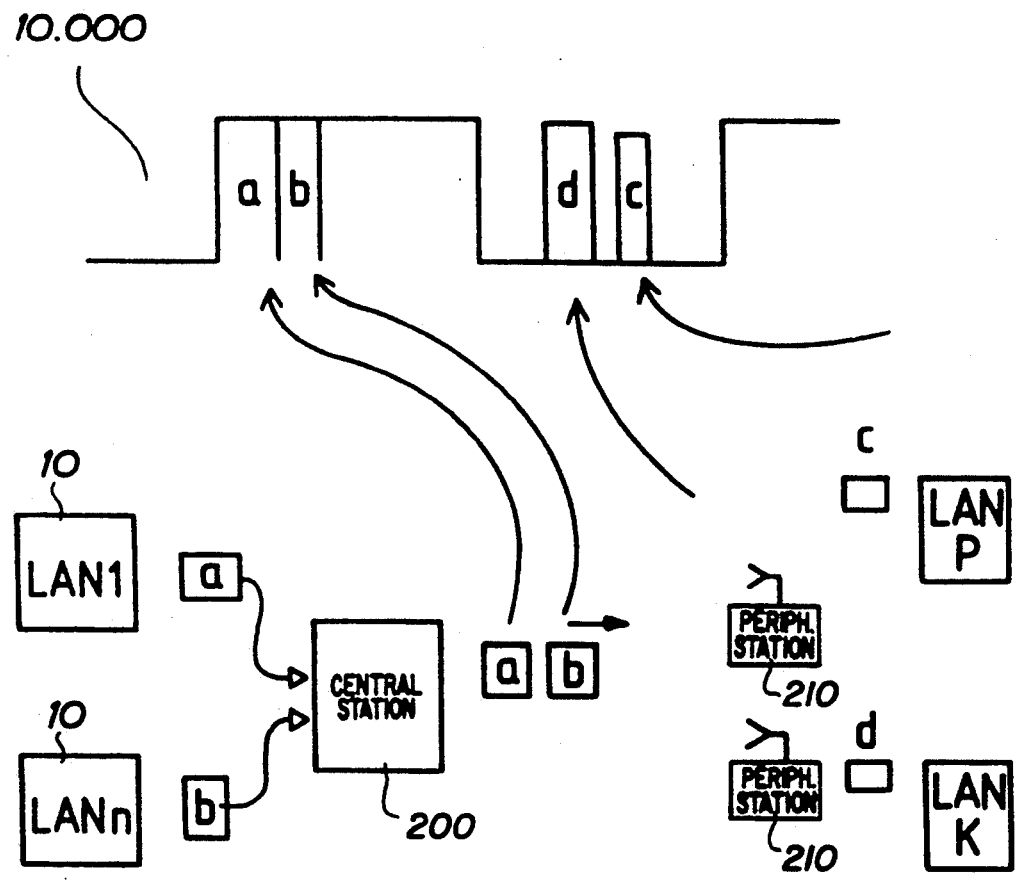

FIG. 25 shows schematically how data packages of varying length, OSI layer 3, is applied to a frame structure in a wide area radio network. The varying length is adapted to a different number of time slices in the communications system or a sub-multiplexing of said system.

Figure 26:
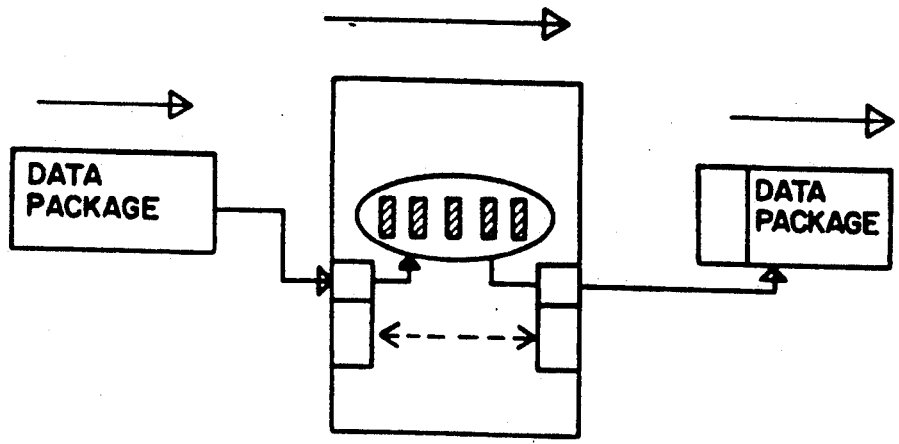

FIG. 26 illustrates the structural fundamentals of time division of the communications system by dividing into fixed time slices and also signaling between each pair of stations with regard to signals being transmitted or received.

Figure 27:
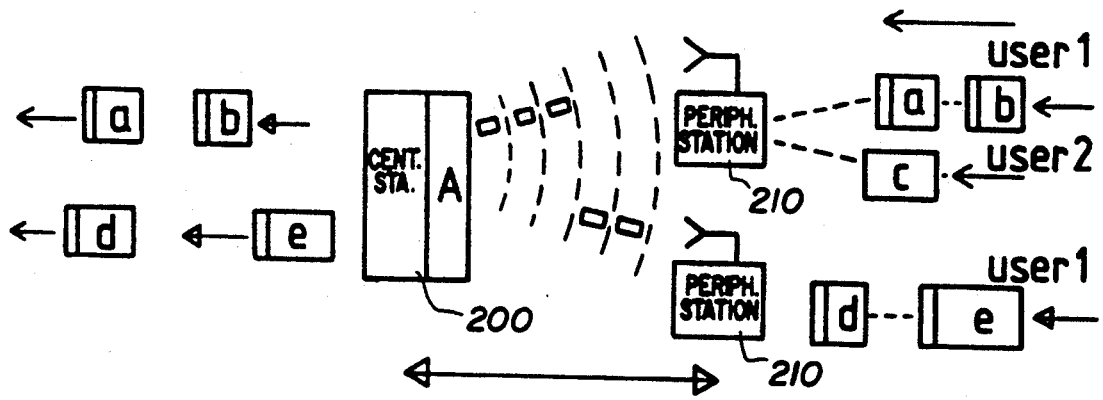

FIG. 27 further illustrates the communications system.

DETAILED DESCRIPTION

Figure 1:
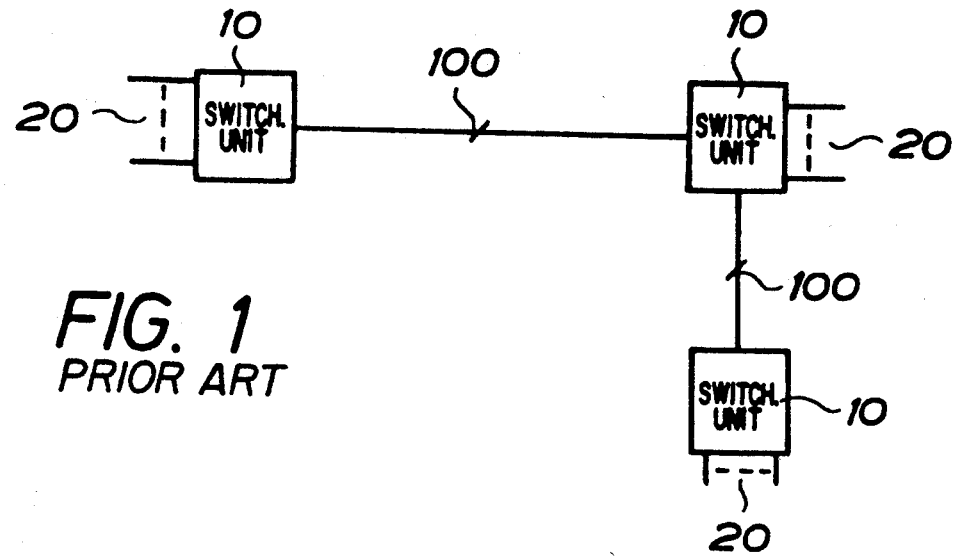
FIG. 1 shows how connections are made point to point between switching units, such as circuit coupled telephone stations.
Figure 2:
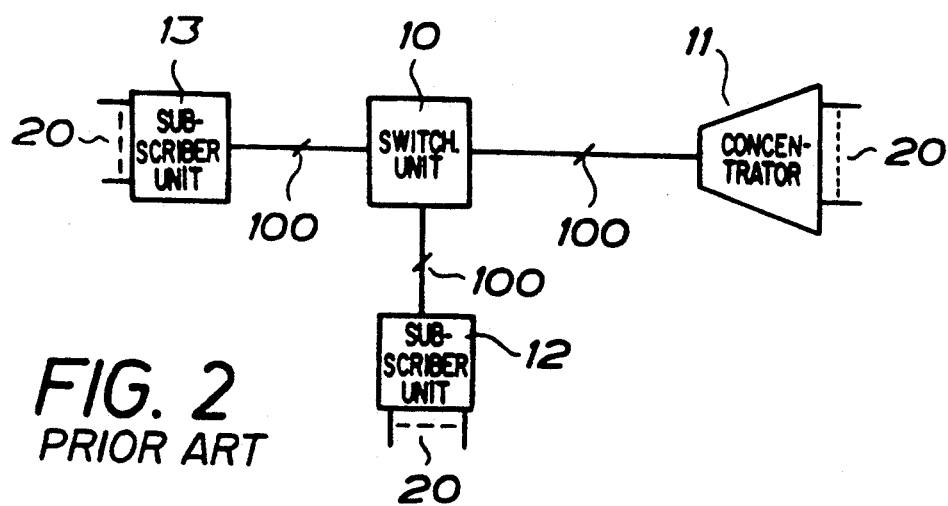
FIG. 2 shows how the connection requirement between conventional units, such as separate subscriber units, concentrators, are multiplexed in a digital circuit coupled system.
Figure 3:
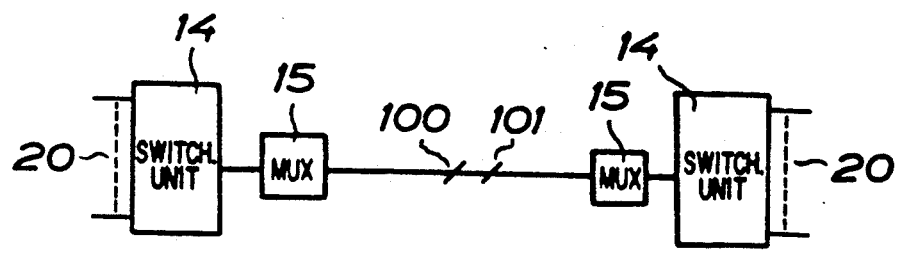
FIG. 3 shows a connection of a multiplexor network.
Figure 4:
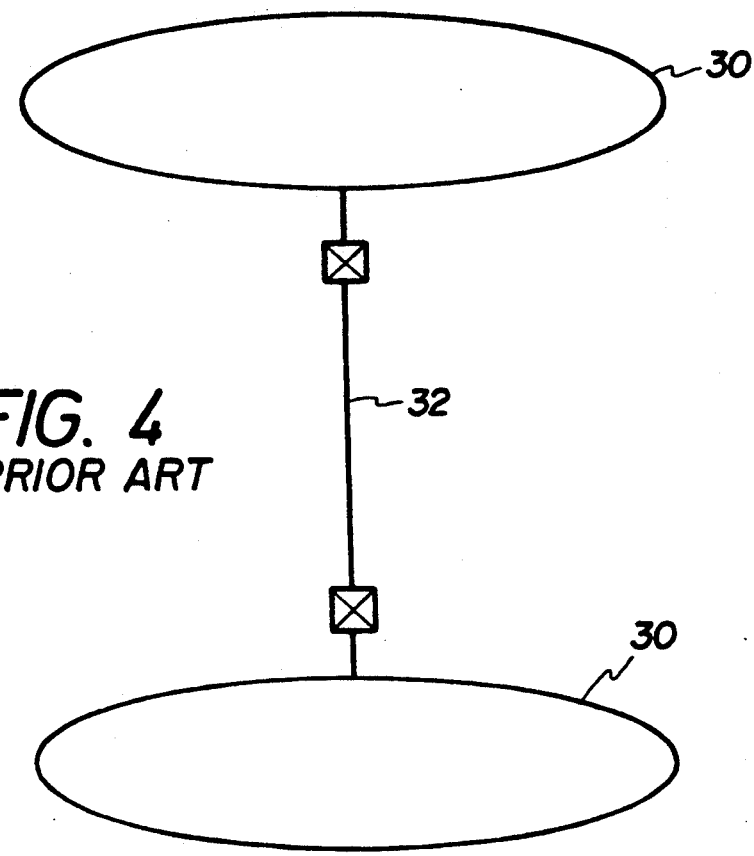
FIG. 4 shows how LAN normally are connected to each other.
Figure 5:
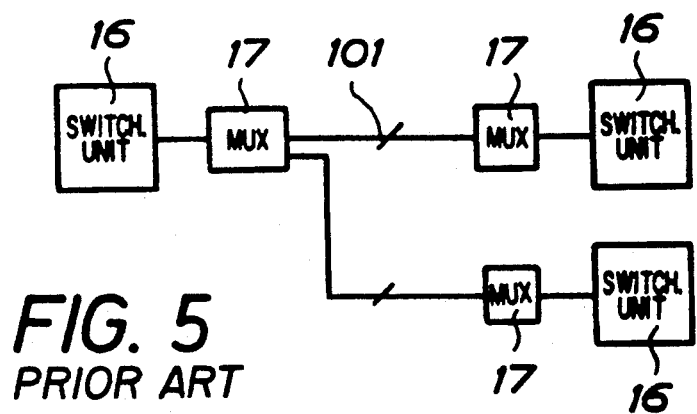
FIG. 5 shows an example of branching a digital multiplexor to different switching units.
Figure 6:
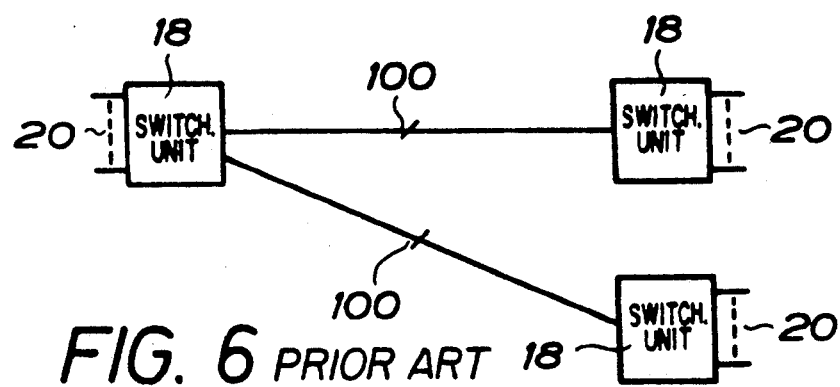
FIG. 6 shows how two substations are connected to a superior station through separate point to point connections.
Figure 7:
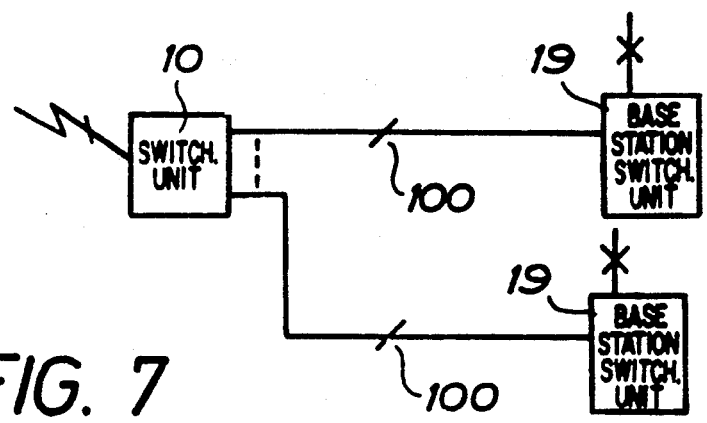
FIG. 7 shows how connections to mobile base stations corresponding units are made through separate connections to a superior exchange.
Figure 8:
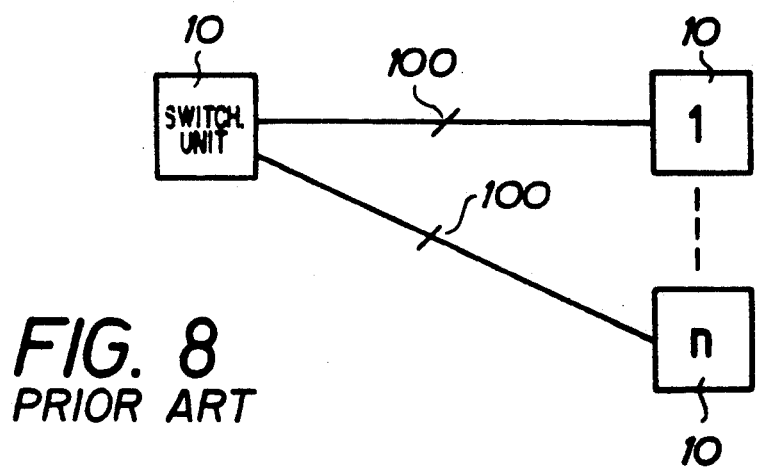
FIG. 8 shows schematically the construction of communications networks between switching units in terrestrial units.

FIGS. 1–8 illustrate prior art methods of communicating between switching elements. In FIG. 1, a switching unit 10 is connected over connections 100 to two other switching units 10. Each switching unit 10 is connected to a plurality of subscribers 20. In FIG. 2, a switching unit 10 is connected over connections 100 to two subscriber units 13 and over another connection 100 to a concentrator 11. Each concentrator 11 and subscriber unit 13 is connected to a plurality of subscribers 20. FIG. 3 shows switching units 14 connected through multiplexors 15 to a network (100,101). FIG. 4 shows LAN's 30 connected through a bridge 32. FIG. 5 shows a switching unit 16 connecting through a branching multiplexer 17 to other switching units 16. FIG. 6 shows a switching unit 18 connected point-to-point to two other switching units 18. FIG. 7 shows a switching unit 10 connected point-to-point to two or more base station switching units 19. Finally, FIG. 8 shows a switching unit 10 connected point-to-point to N other switching units 10.

The description of the invention is made more clear by defining following terms:

Communications system is the system in which the method according to the invention is implemented. The system is provided as a wide area radio system sharing resources in time and space, the time division being time duplex or frequency duplex in accordance with requirements in each application. Application of a TDMA frame structure is in a defined time pattern, that is each TDMA frame consists of a number of time slices. The time total for each consecutive time slice is optimized, among other things with regard to minimizing capacity losses and minimizing transmission delay so as to make possible alternative applications. Each time slice will be represented by a plurality of digital bits which are transferred through a radio channel in a burst. The system is intended to establish one or several point to point connections between two stations or multipoint connections.

Connected signal is a digital synchronous or asynchronous signal which is multiplexed or non-multiplexed or point to point, comprising data frames according to data link protocols for telesystem according to OSI layer 2, such as CCITT, HDLC, SDLC. The object is to transfer transparently a connected signal through the communications system with a high quality with regard to bit error etc. and a minimized delay. With varying traffic intensity in connected signals there is a corresponding utilization of the communications system.

As an alternative a connected signal may be a connection in which the communications system has been completed so as to be able to handle addressing of OSI layer 3 protocol, type CSMA/CD for Ethernet or other data protocols.

Sample is a detection of the content in a connected signal during consecutive time intervals. The detection can be related to information in a respective time slice in a connected channel for instance a PCM signal according G.732. As an alternative a sample may consist of one or several HDLC link protocols or parts thereof etc. Such information in each sample being regarded as valuable for each application will be transmitted through the communications system with consideration to free capacity, priority etc. As an alternative the complete signal is transmitted, if a fixed connection is required.

External signaling stands for allocating capacity in the communications system for each connected signal or group of signals, said allocating being controlled through a digital exchange, manually or otherwise.

The total amount of services available is thus distributed dynamically and adaptively on the basis of traffic needs and shared, if desired, between all connected switching units equally or with different priorities. Speech may have a higher priority than data etc, because constant and short delay is important for speech. Several groups of users, for instance according to FIG. 10b) reference numeral 20, each group being connected through a respective switching unit, are in this way connected under the same communications network.

Figure 9:
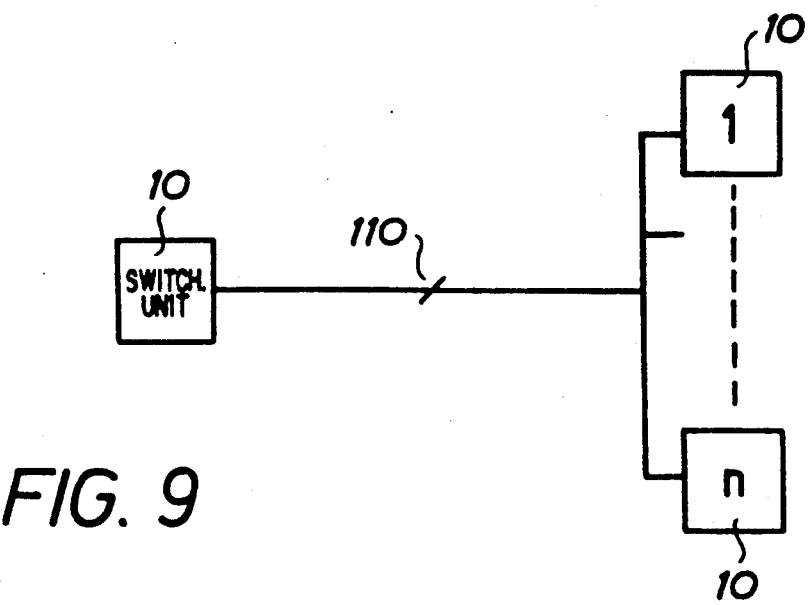
FIG. 9 shows the fundamentals of the invention; that is, a terrestrial network shares a common service resource for different switching units.

It is thereby possible to achieve a higher degree of efficient use of the total number of connections within the area or space. In a total more connected customers in a region can use the common resources than would be the case if communication was made only between two fixedly connected switching units at the time, see FIG. 8 and 9 (also the Erlang formula for dimensioning traffic) on a certain number of connections. The total connection requirement within the region or area is thus lower than conventional solutions, because more subscribers share service resources in this way on the basis of a larger statistical selection of the number of subscribers. From FIG. 8 it is clear that the bandwidth required to connect three geographically separated switching units 10 is the sum of bandwidth space or capacity in number of channels, that is 100+100. 100 is the reference numeral for the number of connections between each switching unit dimensioned for a certain traffic blocking between two switching units. From FIG. 9 it is clear that if traffic between three or more switching units together use a common service resource according to traffic needs the total required bandwidth space or the total number of channels for connection all related switching units is decreased which is illustrated by the total number of connections or bandwidth with separate communications connections, 100+100, is larger than if common connections 110 are utilized.

The consequence is lower costs and when radio communication is used a smaller need of frequency, especially in cases of directed radio communication in wide area systems.

Wide area terrestrial radio systems having dynamically directable antenna systems with a resource sharing according to principals of time and space can be established with a comparatively high digital capacity for each radio channel making such systems well suited and applicable for communications networks for switching units. By using optional time slices in the communications system for each station or for different parts of information, for instance time slices according to PCM, HDLC, data frames, etc. in a connected digital signal to be transferred according to traffic needs, it is possible to transfer or control the transfer of information among other things more efficiently, more flexibly free from interference, and at a higher connecting and disconnecting speed than is possible with existing solutions being used in other wide area radio systems of terrestrial type (for instance, satellite systems with burst-switching control in each station).

The method is implemented by means of a wide area radio system having a capacity which, for instance, corresponds to at least the sum of traffic needs for three switching units. The dynamical communications network is made for each switching unit, see FIG. 10a) and 10b). From FIG. 10a) it is clear that digital connections 100 are connected to a communications system 150. Digital connections of switching units 10 and 19 are connected to stations 200 and 210. The communications system has a common communication resource 220 for broadcasting for each of said switching units. From FIG. 10b it is clear how the communications system can be utilized in alternative switching units.

The advantages of implementing the system by radio clearly appears when the traffic needs within a certain local region varies strongly in time and when the amount of traffic, or peaks of traffic, also is moving from place to place, for instance between a suburb and a city, along major roads to different points, as in mobile communication, see FIG. 11. FIG. 11 shows that a plurality of geographically separated base stations 19 are connected to the communications system through digital signals 100.

FIG. 11 shows schematically how the communications system by radio 220 is in contact with said base stations 19, and shows also that connections 100 for mobile base stations 19 at exchange 10 are transferred in both directions to each of the corresponding mobile base stations 19 through said communications system. Only fundamentals of how said base stations 19 can utilize the common service resource in such a way that they adaptively according to traffic needs and dynamically according to traffic needs share their common service resource are shown in FIG. 11. The adaptability can be self-controlled, that is capacity is used gradually when resources are required. As an alternative the capacity is controlled by the exchange or a group of cooperating exchanges or other external control.

If, for example each of said base stations 19 is connected through one or more digital signals having a capacity of 1.544 or 2.048 Mkbit/s and each of said signals is multiplexed to hold a number of subscribing channels, for instance 24, 32, 64, 128 or any other number depending on the channel band width for each subscriber in that mobile service, traffic is transferred through said communications system only for those subscribers having traffic.

Basically, any available time slice in the communications system is utilized by any subscriber in the mobile system. The communications system makes decisions of its own if required to avoid interferance between subsystems in choosing time. If interference occurs the use of time slices is reorganized.

For clarity only one mobile network service is shown but different types of networks or different hierarchies of communications needs in the same network can utilize one or several systems or a system in each region in which the communications system is applied.

Mobile communication is one example in which the communications needs for a number of base stations vary as disclosed above within a region (e.g., a city with suburbs) from a traffic point of view. The problem is that the peak need of the number of connections needed between exchange and base station normally is considerably higher than the mean need for each base station. The number of base stations requiring connections within an area/space is increasing rapidly in among other places like the countryside, cities, offices etc. and for NMT, GSM, cordless telephones and in the future PCN, UMTS and other similar services.

According to present connection methods the effects are as set out below.

In summary, in point to point connection systems there is a large waste of resources with regard to number of connections. In such systems the number of connections for each base station individually is dimensioned for peak traffic. There, therefore, are difficulties in establishing fast and flexible networks which are not dependent on the public telecommunications network.

For instance, a conventional radio link of point to point type gives a low frequency efficiency, see FIG. 12a.

FIG. 12a shows how radio link terminals 300, each of which having a frequency of its own in the same geographic zone, connect switching units 10. It is also shown that three pairs of frequency 400, 401, 402 are required and these pairs may block said frequencies irrespective of any traffic going on or not. Wide area radio systems for fixed applications is at present used to create fixedly connected or, for each individually connected subscriber, dynamically connected synchronous, or asynchronous communications connections on a subscriber level for telephone or data communication. That is, a transparent connection is established to each subscriber at that moment requiring a connection according to a circuit coupling method, see FIG. 12b. In telephone communication a circuit-coupled connection is used to each cooperating TDMA, FDMA system user who which to communicate. Wide area radio systems for minor sporadic asynchronous data communication needs of packet radio type exist random allocation of resources such as CSMA, ALOHA etc.

According to the invention digital synchronous multiplexed or non-multiplexed telecommunications between switching units of the type described in the introduction are realized in a wide area system providing communications connections in some area or space. The traffic capacity of the system is so high that at least connection of three or more switching units, each of which having a maximum capacity requirement corresponding to 2 Mbit/s and/or 1.544 Mbit/s or 160-192 kbit/s, is used. The invention is implemented in a wide area radio system dynamically connecting traffic according to needs in each service within each connected signal, and realizing transparent connections mutually cooperating with the actual total traffic need. All switching units are connected to the communications system in such a way that redundant information, such as unused information in time slices of signals, can be chosen not to be transferred within each connection, even if the interface for each connected signal is for instance 2 Mbit/s, 1.544 Mbit/s or is of a higher capacity, for instance 8 Mbit/s, 10 Mbit/s etc.

The wide area system is established with a TDMA frame structure. The implementation of such a system in CSMA, spread spectrum technique, is also possible.

The total radio channel capacity of the wide area radio system is dimensioned in such a way that as a total there is sufficiently high capacity available in a radio channel for connections for three or witching units separated in space. Each switching unit 10 or 19 is connected to the communications system through one or more digital signals having a capacity amounting at least to a capacity corresponding to 2.048 or 1.544 Mbit/s, 144-, 160-192 etc. or a multiple or submultiple of 64 kbit/s. By applying time division in the communications system it is possible in dependance of the information transfer requirements for each connected signal to dynamically share said common communications resource, see for instance FIG. 13. Signals 1000, 1001, 1002 are connected to a central unit 200 of the system. In corresponding stations 210 corresponding signals are connected. One signal 1000 in one of the peripheral stations 210 is connected to a switching unit 19 and a second signal 1001 is connected to another unit (not shown).

FIG. 14 shows the basics of transferring connected signals. Digital signals to be connected and transferred are of the type CCITT, G.703/G.704, V.35, V.36 or other similar international standards. Normally they are multiplexed according to G.732/G.733, IK.721, I.720 ISDN, multiplex standards for compressed signals such as ADPCM or mobile standards etc. having a 64, 32, 16, 8 kbit/s subdivision per channel in Europe, Japan, U.S.A. etc., or a corresponding hierarchy for wideband systems, i.e. connected 2.048 or 1.544 Mbit/s or other standards or "de facto" evolvating standards for synchronous digital communication between switching units, SONET, SDH etc. In addition, multiplexing according to data link protocols such as OSI layer 2 exists for bridges between computer networks etc.

Information transfer needs varying with the traffic for two or more geographically separated switching units share the capacity in a common communications system. The traffic needs for each of said switching units use to a varying degree the transmission capacity of the communications system within the area/space covered by said system. The degree of utilization is controlled, besides by traffic needs, by priorities or other external control conditions. If free capacity exists a connected digital signal is transferred transparently. As an alternative only certain parts of each connected signal is transferred through the communications system, i.e. information detected as redundant in consecutive samples, or in any other way being regarded as redundant information is not transferred. Redundant information is recreated in the opposite station terminal by bandwidth saving signaling so as to provide a fictive transparent signal in the opposite end.

What is described above is shown in FIG. 14. According to FIG. 10a a communications system 150 comprises one or several central stations 200 and under each of said central stations 200 to one or several peripheral stations 210. Between central stations 200 and peripheral stations 210 there is a radio transmission in bursts 220; each central station 200 is provided with an antenna system 230 dynamically controlled in direction, said central station 200 comprises input terminals for signals to be transferred to an opposite station, said input terminals at the central being referenced as 1000, 1001 and on the peripheral stations 210 being referenced as 6000, 6001.

The information content in two connected signals 2000, 2001 is shown fictively in FIG. 14. The structure of information, its volume etc. is only schematic and illustrating. References 1i1 and 1i2 respectively, etc. represent such information which is desired or required to be transferred by said system. Other parts of the signal are not critical for the application and do not necessarily have to be transferred. By detecting during interval F1 and F2 respectively, signals, analyzing said samples with regard to conditions and demands given, the information in connected signals is directed to time slices A1, B1, C1 etc. already allocated to each signal 2000, 2001 and repeated in next frame 7000, A2, B2, C2 for the next sample in the communications system.

During the second sample F2 a new requirement 2i3 is detected. If transparency is highly required such a signal is allocated to the communications system as soon as possible. From the figure it is clear that the information 2i3 rapidly has been allocated to said communications system.

Fast allocation can be provided also by keeping a number of time slices prepared in advance in the communication system without loading to any extent the system in a negative sense during heavy traffic load.

Disconnection of signals already allocated normally takes place when a number of consecutive samples indicate that current information no longer has to be transferred. By having a fast establishing and a slower disconnection transparent and traffic adaption is made efficiently, the demand for signaling and thereby also the overhead and complexity of the system is limited, if total dynamics is not implemented.

FIG. 14 also shows how information from a sample 2100 in time interval F1 is transposed to a time frame 5000 in the communications system (FIG. 18, 10.000), and recreated in an opposite station terminal as corresponding signals 3000, 3001 having a character corresponding to signals 2000, 2001.

Thus, to each individual connected digital multiplexed or non-multiplexed signal specific signals or time frames etc. are connected and disconnected for a probable transfer through the radio communications system in such a way that the transfer of information for each connected subscriber to the switching units from a transfer point of view is controlled so as to transfer in the wide area communications system only information required for each connected service.

Digital signals connected to the system and intended to be transferred are analysed with regard to traffic transferring means. The transfer of information through the radio communications system takes place by transferring required information for each service through the radio communications system. With reference to FIG. 14 information required to be transferred to the radio communications system in one frame thereof is 1i1, 1i2 and 2i1, 2i2. Two consecutive samples F1, F2, 2010 are shown. The amount of information that could be transferred in each time slice of the communications system is given some amount of space for information. Depending on the content of the information in each amount of information, which may consist of a speach channel in a 64 kbit/s PCM system, or e.g. a 16 kbit/s for mobile telephone, different types of multiplexing are made on time slices or bursts of the communications system so as to utilize efficiently the communications system.

This is shown in FIG. 14 in that information in time slice A1 consists of information from two channels in a PCM system, HDLC or corresponding, that is from 2000, 2001.

The length of said sample is adapted to an appropriate time delay for signals to be transferred through the system and the number of bits of the bursts of the communications system is also optimized.

The flexibility and possibilities of dynamics with regard to traffic is thus obvious compared to previously used systems or a system in which each station in the radio communications system had to be checked with regard to burst length after each change of needs.

In the example transfer in one direction from a central station 200 to a peripheral station 210 has been described but basically there is a correspondence in the opposite direction.

In cases where the information, such as in one time slice in a multiplexed connected signal, does not have to be completely transferred through the radio communications system such information can be transferred with less band width instead or be skipped completely. Recreation in the opposite end of the communications system is then made during such a time interval desired to generate the synchronous digital flow, or to recreate the digital signal in the original shape.

Such conditions are signalled between affected stations.

Besides the method described above the communications system can be provided with a function controlling connecting/disconnecting of external units, exchanges etc.

FIG. 15 shows the basic method applied to, among other things, non-multiplexed signals.

Bit flow is detected for each connected signal. The existence of information which has to be transferred is detected within a sample interval 1 as information A1, B1 and time is allocated in a frame 5000 of the communications system. During one or some of the following time sequences 2 no information required to be transferred exists in the connected signal 1010. The information B2 in signal 1011 is allocated time in the following frames 5010.

If the amount of information is varying sporadically, as, for instance, normally occurs for packet sizes in computer networks, OSI layer 3, several time frames can be utilized in each frame 7000. As an alternative, several consecutive frames can be used in the communications system in order to provide transparency in transfer etc. for the applications. Required data can be read by communications system from incoming packages and such data can be used for generating an appropriate connection and for signalling to the opposite station or stations.

The communication system uses either ether-based transmission as a medium or as an alternative fibre, cable, wire etc. The basis of the method is to dynamically allocate time for transmission in the communications system in dependence of the content of information in connected signals. Two basic principles or a combination of said principles in dynamically controlling the transfer of information through the communications system are important: firstly the transfer of information is controlled through connected digital signals connections 100, e.g. T16 in a multiplexed 2.048 Mbit/s signal, or corresponding channels for 1.544 Mbit/s signals standards, or through external signalling, and secondly transfer of information is controlled by analyzing consecutive segments of each connected signal. For instance, a segment is compared to previous segments according to predetermined controllable conditions of comparison, before information is transferred in the system, see S1 and S2 in FIG. 16. In cases where the condition of comparison shows that information in a segment does not have to be transferred this is signalled to the opposite station in the communications system. In the opposite station information of a previously transferred information of that connected signal is then re-used to simulate the signal if desired. Conditions of comparison for instance for different time slices in a multiplexed connected signal may vary due to different requirements existing for different services such as speech, data or images etc. It is thereby possible among other things to transmit certain time channels, e.g. 64 kbit/s PCM CCITT G.732, in connected multiplexed signals transparently through the communications system. This approach applies for signal channels in connected signals or for other channels which for some reason have priority or are fixedly connected or which always get capacity when required. Channels are in this case referring to time slices in a connected signal or a certain data link package in a connected signal etc.

A detected segment (sample) can consist of one or a multiple, or parts of time channels of connected signals, if they are multiplexed as described above.

The reason for this is that certain services may require capacity for several 64 kbit/s transfers (as e.g. ISDN) while others may require capacity for data transmission of 256 kbit/s or similar examples.

Further, the system is adapted for transferring of information between an exchange and mobile base stations and because the channel speed may be 32 or 16 kbit/s the detected segment is adapted in accordance therewith so as to control that the transfer through the communications system is optimized in transferring only necessary channel information.

FIG. 16 shows how consecutive segments of information in a connected signal 1010 are detected as S1, S2 etc and how the result of said samples are stored in storage 1 and 2, 20,000, where it is compared to previous content of information. In the third sample it is schematically shown that the result of a certain number of samples S2 results in a disconnection of information, that is, since the information is repeated it does not have to be transferred. It is also known schematically that as the content of information in S2 is detected a not requiring to be transmitted in the third time slice a corresponding transposed channel of information in the communications system, 50000, S2", is disconnected, i.e. that time reservation for a complete transfer of information represented by a segment is disconnected. However, information is still simulated in the opposite station.

This illustration is made only for disclosing fundamentals of the invention.

Through a control channel or control channels, S0, between a central station and associated peripheral stations shown schematically in the communications system 209 the required signalling to opposite side of the system in both directions is made to recreate and address transferred bursts to the correct destination.

To prevent that the system is overloaded when the system has a limited capacity the system is used only for a certain amount of traffic in such cases when the above described methods with total dynamics are utilized. I.e., a limited resource of capacity is saved in cases when the communications system is cooperating with a plurality of sub-systems possibly interfering in time and space, so as not to get into dead lock. However, if there still are overloads priorities are used, or temporary disconnection is made successively to users having the lowest priority upwardly with regard to priority until the problem is solved.

For instance speech may have a priority than data. Certain customers or time slices in connected signals or the complete connected signals can be given a higher priority compared to other signals.

There is implemented a fast allocation of new time slices which are found necessary to be transferred. A temporary capacity for such requirements can be allocated before a permanent allocation of time is made in the system in such cases where basically a "direct" connection is required and in cases where it is desirable not to lose any or a limited number of bits of information or to avoid further delay. This connection of time slices already allocated in the system is delayed a number of consecutive samples so as to avoid high signal capacity requirements.

Efficient dynamics of traffic is generated also by the system being made for slow questioning of a substantially higher number of peripheral stations than normally communicating simultaneously. Thus, a large number of radio stations can be connected to the network and be polled only slowly during time intervals in which no information has to be transferred. In this way redundant connections can be created without necessarily using more than a fraction of the capacity of the communications system in normal situations. Hereby there is provided among other things frequency efficient, rapidly connectable, dynamical communications networks, especially for highly sporadic traffic needs, redundancy in catastrophes, alarms etc.

Before connection or allocation of time in the communications system for transferring connected signals, information not directly possible to be transferred through the system is stored so as to later be transferred when time is allocated in the communications system for such transfers. Normally a limited number of digital bits may be lost, for instance in speech traffic, during connection without this being realized by a customer. Due to the fact that a certain amount of time is required to receive a time allocation in the communications system there would be a delay if all information has to be transferred. To minimize the delay, it has been found that a certain number of bits can be lost during a connection. The number of lost bits of information during connection is different in different services. This approach is used in the existing DSI (Digital Speech Interpollation) concept for satellite system, as is further described below. The system utilizes a varying reserve transmission capacity in dependence of the amount of information required to be rapidly connected to the communications system.

The communications system is provided with functions principally allowing a direct connection of subscribers requiring that. The capacity is allocated directly in the next frame in the communications system and signalling can be made directly in this frame if the system, for instance, is provided with a signalling function in an optical suitable time frame independent of previous use, directly being allocatable anywhere in the time slice and rapidly being identified as a control burst. This function can be utilized also in such a way that new allocations are made temporarily before a successive continuous updating.

As a result delay or loss of data is decreased or avoided during set up.

A fast and "direct" allocation of new traffic needs is made from a peripheral station by using capacity reserved in advance but not used, and by a direct signalling in a subsequent frame to the central station. In emergencies signalling may take place in a time slice already allocated and occupied by traffic, if it is required, because the system detects what type of burst is coming in. (See information below on the control signal).

In cases where only the latter method of the two basic methods mentioned previously, is applied, i.e. the method of connecting and disconnecting is not controlled by signal channels of connected signals, the advantage is achieved that the communications system does not need to communicate with a connected application. This is a major advantage because different manufacturers and applications require different types of signalling. In such cases important demands are a fast setting up, stability, transparency, low delay in transmission, so as to be able to connect general switching units without creating large problems. Each consecutive frame time in the communications system is adapted to associated applications. To be able to adapt the system to general telecommunications applications without really intervening the frame time is below a few ms for the system, when there is an adaption to general applications.

It is further possible to apply a traffic concentrating communications system to switching systems not using signal channels, such as synchronous digital telecommunications networks, for instance traffic between LAN's. The method of sampling, comparing and transmitting "valuable" information is to some extent comparable to a type of digital compressing for speech according to DSI (Digital Speech Interpolation) or TASI. One difference is that the method is substantially broader and is not limited to speech.

Further consequences of the method are that wide area systems do not have to be designed with interfaces of subscribers equipment associated to the system as is the case at present with existing systems. This means that when developing wide area systems it is not necessary to develop specific equipment for connection of subscribers as is the case at present with existing systems. Any standard switching units can be used. This means that the wide area systems do not become as closed and as specific as existing TDM/TDMA systems used at present, in which specific switching systems have been developed without making the system applicable in a more general aspect.

The method can be implemented also in another medium than the ether 220 such as fibre cable, wire 230, etc. as is clear from FIG. 17a and b.

With reference to 17a the basic structure of the communications system is shown, said system representing one or several central stations 200, each of which communicating with associated peripheral substations 210. A number of digital signals, 1 . . . n, which are to be transferred to an intended peripheral station or peripheral stations 210 are connected to said central station 200. At each of said peripheral stations 210 corresponding signals 1 . . . k being connected at said central and intended for each stations 210 are connected. Reference numeral 10 is a switching unit of standard type and the subscribers are represented by 20.

A burst duration terrestial communications system shown in FIG. 17b can, according to the method described above, to implemented also where the ether medium is replaced by a wire, cable or fibre 230. The advantages are basically similar to advantages of the radio method but normally the radio method will provide smoother possibilities of access.

Central stations are represented by 90 and peripheral stations by 9. The medium wire etc. is represented by 230.

It is convenient to implement the method in wide area radio systems controlled in time and space according to PCT/SE89/00047. In this case the communication system is the time and space controlled system. The advantages of providing this type of time and space controlled system having a TDMA frame structure are obvious because it is an advantage if the information is split in well defined time fragments to increase the degree of possible sharing of resources in time and space. Furthermore, careful time control in time intervals is important in these cases so as to not misuse transmission capacity, that is, by directing information into a "wrong" space (area) segment.

In the time and space controlled system the quality in used time slices in the system is monitored. Time slices which are not used for traffic etc. are analyzed with regard to interference, quality etc. In randomly allocating time in the communications system a bad choice of time and space allocation between different parts of the communications system may happen in inconvenient situations, such as during periods of high traffic. Basically, when needed, the allocation has to be fast. To prevent total interference, which is hard to clear up without disconnecting large parts of connected traffic in several places, for instance at different sties, it has been found advantageous to keep reserve capacity in the system.

Obvious risks for interference in so-called risk pairs should be eliminated in advance. Another applicable method is to continuously, in advance, select time slices which should be allocated for transfer and to measure the quality and the result of such successive selections. The selection of time for controlled signal bursts are more careful and information concerning these bursts are typically complemented with powerful error detecting methods. A more simple error detection is typically used for customer traffic than for control signals in order to avoid extensive separate analysis and processing of these signal and also to keep down overhead in the communications system. In such a system, different types of bursts are identified fast because the synchronizing information is used also error detection in order to keep down overhead and also to decrease processing needs.

Signalling demand for setting up and disconnecting is optimized to provide safe signalling and low signal capacity. To realize this when using DSI (Digital Speech Interpolation) or similar functions (i.e. when a conventional capacity is connected signal needs are divided in different phases.

When, after detection of a connected signal, an essentially direct connection is desired, an allocation of time and space made in advance is used temporarily.

For instance, a system may allocate time slices within a certain time interval consisting of a number of time frames, a multiframe.

A complete updating and also in some cases requests for disconnection of time and space capacity is made with an additional number of time frames, a super frame. By this total continuous updating process there is achieved among other things security in short breaks, fading etc.

This method results in a fast and cyclic updating, permitting a direct set up without or with a limited time delay and limiting required signal capacity. In addition, complete slow cyclic updating prevents, for instance, problems in fading in a radio channel or other disturbances.

The advantages of a communications system utilizing random or controlled allocation in an appropriate position in a time frame, compared to one utilizing a certain varying burst length for each packet transaction or a certain number of consecutive time slices depending on the actual traffic needs, are obvious. In a time and space controlled system where fragmentation in well defined time slices permits the user of space within those slices, such use has major advantages by allowing a more efficient sharing of resources for several stations than if varying continuous burst lengths are utilized. Furthermore, the method is advantageous in allocating dynamically or in disconnecting traffic without an extensive restructuring (normally none) when the traffic is varying. A high gain in flexibility is thus achieved compared to applying burst length variation in the communications system for digital multiplexed signals or similar information which can be fragmented before being transferred.

A communications system based on time and space control is provided with means for using a structured time sharing in time slices. To achieve an efficient traffic dynamics a fast and reliable signalling between associated stations is basically required. To eliminate a need for extensive process identifying of the content of each burst the identifying of bursts are made already from the attached synchronizing information. As a result thereof there is a possibility of a separate process, realized for instance in hardware, to basically directly determine the type of packages coming in. The attached synchronizing information, consisting of a few codes, is rapidly identified and detected with respect to quality. In this way there is a simple selection if data is purely user data or control information. According to the method it is possible at any time to "get" a TDMA traffic time slice and apply, for instance temporarily, control data. The control information is completed with further error detection to guarantee the quality of control messages. This is a accomplished in a CRC (Cyclic Redundancy Check) or an alternative error detecting code. Furthermore, this method creates opportunities to basically send temporarily control information packages instead of user data, if the system is heavily loaded with regard to traffic and disturbances are generated, so as to rapidly solve a problem and also to allocate or reallocate time frames etc.

FIGS. 18-24 show in more detail principles of the dynamic communications system.

The bursts are divided into different shape and function in dependence of the actual object. The Figure shows schematically that synchronizing information, subscriber information, and possibly also an error code and also a further control code and protection area all are required.

FIG. 18 shows the TDMA frame structure of the communications system if made frequency duplex 10.000 or time duplex 5000. It is also clear that the system frame is provided with a time slice division according to TDMA 10.020 or 5020.

The basic structure of a burst is shown by 220. The total amount of information or control data is represented by 219. Synchronizing data 2311 and identifying of type of packet are also shown. In cases where error detecting or an alternative error correction is applied the reference numeral 2312 is used. A protected area between bursts is represented by 2313.

If time duplex is applied a separate allocation of resources in the communications system can be made individually. In this way a further compressing of the data transfer capacity is achieved in the communications system.

FIG. 19 shows how different types of connected signals 2000, 2001, 2002 are adapted to the burst size of the communications system by different multiplexing, if required. That is, when the communications system for instance represents a capacity of 64 kbit/s for each burst four subscribers utilizing a channel capacity of 16 kbit/s can be multiplexed to said burst. Inversely, if a connected subscriber channel has a larger capacity than said burst a number of bursts in each consecutive frame may represent the subscriber.

If a connected signal does not have a channel division for each subscriber information thereof is transferred sequentially burst by burst, or when required a number of bursts in each frame in the communications system as shown at 2312.

FIG. 20 shows an example of a CCITT standard signal 2000 according to G.732. This signal is used only for illustration. Any other digital signal or time segment can be used. A digital flow of 2.048 Mbit/s which is to be transferred transparently through the communications system is analyzed within 2 ms with regard to the information content thereof. The total content is 4096 digital bits. These represent 32 channels. Each channel comprises 128 bits 219 of information. Depending on if each detected subscriber channel (of 64 kbit/s) of 128 bits is to be transferred, i.e. if the channel is set up or not or if free capacity exists etc., with regard to priorities etc. each set of information of 128 bits per subscriber channel will be applied to time slices, bursts 220 or not. If the subscriber channel is to be transferred transparently 128 bits are applied to the time frame of the communications system, said time frame having a frame time sequence of 2 ms. During the next 2 ms sequence the next detected content of 128 bits is transferred and so on until a disconnection is desired. In the reverse direction the inverse applies.

If a 4 ms interval is selected the information content of each channel is 256 bits etc. If a 2 ms interval is selected and each channel represents 16 kbit/s the information content on each channel is 32 bits, etc.

Instead of or as a complement to a subdivision of time slices of the system according to narrow band TDMA a broad band CDMA (Code Division Multiple Access) or so-called spread spectrum technique can be used in the communications system.

The communications system intended for connection of traffic between different switching units can be made also in such a way that burst lengths varying to the traffic needs dynamically are established in the wide area system. This case is suitable especially in traffic between local data networks, Ethernet, token ring, FDDI, and is applicable also in other integrated systems for speech and data which utilize burst length coupling, etc. LAN traffic is affected with no communication through bridges or similar units adapted for integration with synchronous tele-networks, i.e. traffic in one computer network (terminal-PC etc.) with varying length is applied to the wide area system. Allocation of resources with different varying burst time length is made in the system. However, normally a varying number of time slices are used and allocated in the communications system, if required.

If the system is adapted for varying burst lengths, e.g. for this type of interactive applications according to OSI layer 3 or corresponding, the frame structure is adapted also to prevent interference between geographically close subsystems. To avoid interference between central stations close to each other when time duplex is used, the frame time is restricted to a permitted transmission time and receiving time, and the total maximum data package length to be transferred is also restricted. This principle is shown in FIG. 25, in which a varying burst length is applied.

The switching units which are connectable to the system can utilize different band widths for each individual time channel. This is done in the conventional CCITT standard of 64 kbit/s which gives for instance a very high quality speech transfer. New services and applications, e.g. in computer and mobile communication, result in new claims of band width saving digital speech algoritms, e.g. 8-16 kbit/s, ADPCM in CT2, 34 kbit/s. ISDN basic Access and/or data communication may demand an alternative multiplexing to 64 kbit/s, e.g. 144, 160, 256, 384, etc. variations, such as subspeeds by e.g. 2.048 Mbit/s or 1.544.

FIG. 21 shows the fundamentals of the communications system. 203 represents an information control unit controlling the information with regard to the information content and controlling also which information is to be transferred. Unit 202 represents an external control unit making it possible by external signalling to control the allocation of what information to be transferred through the communications system and also which information might be regenerated or simulated. The unit 209 represents the communications needs of each connected signal with a corresponding connected signal in another station.

Unit 204 relates to a central station. In the embodiment shown it is clear that two central stations 204 may cooperate via interface 2500.

FIG. 22 shows schematically how each connected signal is detected consecutively and compared at 20.000. Depending on the result a setting up or a disconnection is started or initiated. This is done in 20.100, initiating a required development. Through a control channel 20.101 signal information is applied, if needed, to an opposite station.

Different conditions for a set-up and a disconnection, priorities, set-up time intervals, are illustrated highly schematically in 20.002, 20.001, 20.005, 20.006, and exchange of control information 20.007 etc with the communications system. A signal burst 219 and 2192 represents a control burst.

Thus, the communications system is adapted to transfer digital multiplexed or non-multiplexed connected signals transparently through the system by so-called samples of the signal and by applying these to the frame structure and dividing the capacity of the communications system. A fixed or an adaptive set-up is possible.

The system can be made to utilize existing or similar signalling such as T 16 in a 2 Mbit/s signal, the system thereby passing channels through the communications system in a circuit coupled method (in this case by means of an optional function to detect such signalling). Channels which are circuit-coupled can be forced by customers or an application to be set-up continuously regardless of whether there is traffic or not. Furthermore, in a method corresponding to the method described above, each channel in a multiplexed signal which is set up can be detected on the basis of information which has to be transferred or not. In, for instance, a speech application extensive silent sequences can be utilized temporarily by other traffic to utilize more efficiently the capacity.

Different priorities are used to ensure that information which is required to be transmitted will be transmitted independent of the traffic situation. This applies to signal channels T 16 corresponding to 2.048 Mbit/s signals or similar for T1, high priority traffic etc. To ensure that a channel which is set up in a "silent couple" when no required information is detected for that channel or when disconnecting due to interference etc., the system is permitted to retract a time slice already allocated (e.g., in a speech application) to be assigned to traffic from a higher priority channel. Such a retraction limitation may be done during a permitted time interval for detecting a "silent couple".

It is also possible to use traffic capacity between several substations, especially if the central stations are placed at the same site. If one substation is overloaded a system operating in parallel may take over the excess traffic.

Signalling to a corresponding station is shown schematically at 20.100. Thereby control data information exchanged with a corresponding station 2194, FIG. 23, is controlled.

FIG. 23 shows how channel information 219 is inserted in the recreated digital signal. It is also shown schematically how control data 2191 controls regeneration of the digital signal for a multiplexed signal 2000.

FIG. 24 shows schematically external control of a channel connection. For circuit-coupled digital telephone systems in Europe this is done according to T 16 in a digital 2.048 Mbit/s signal. The principle applies to any external control.

The signal channel states e.g. that four subscriber channels in a digital signal are to be connected and transferred through the communications system. Depending on available capacity, priority of the channel compared to other channels etc. time slices will be allocated in the communications system.

By having optional priorities on individual subscriber channels or complete digital connected signals it is basically always possible to achieve the requirement of transparency if the sum of the capacity demanded by the most necessary top priority customers does not exceed system capacity.

Possible requirements of transparency e.g. for ISDN connections are achieved in this way.

FIG. 26 and 27 show how data packages coming in are directed to time slices of the communications system.

In cases where time transparency is an absolute requirement, as in speech communication, each station can have an adaptive dynamic allocation of a number of time frames per frame according to the varying need. In this case there is an intermediate storing before transmission across the system, or as an alternative retransmission etc. is controlled by a superior system, if data packages are lost or not correct etc.

From the central station there is an adaptive allocation of capacity according to the information required to be transferred to a switching unit in each peripheral station.

We claim:

1. Method in a radio communications system for transferring digital signals consisting of segments of user data between a transmitting station and a receiving station through a radio channel, including the steps of:
    analyzing consecutive segments of said data with respect to content and amount of data that is to be transferred;
    adaptively assigning channel capacity based on said analyzing;
    applying said signals to a time frame structure, each frame having a predetermined number of time slices;
    transmitting data included in said time slices as packages through said radio channel;
    transmitting control data from said transmitting station to said receiving station, said control data being provided in control packages in time slices of said time frame structure; and
    assigning dynamically and selectively to said signals time slices in said frame structure, said slices of user data signals being transmitted as information packages.

2. Method according to claim 1, wherein the step of transmitting data includes the step of transmitting a synchronizing signal in each package.

3. Method according to claim 1, wherein the step of applying includes dividing each frame into time slices of equal length.

4. Method according to claim 1, wherein the step of transmitting data includes the step of transmitting a synchronizing signal in each package, wherein said synchronizing signal includes data distinguishing said information packages from said control packages.

* * * * *